(12) United States Patent
Hatae et al.

(10) Patent No.: US 6,466,260 B1
(45) Date of Patent: Oct. 15, 2002

(54) TRAFFIC SURVEILLANCE SYSTEM

(75) Inventors: Yasuhiko Hatae, Tokyo; Hisashi Kiyose, Matsudo; Hitoshi Fujisaki, Sayama; Yuuichi Kuwahara, Higashimurayama, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/190,006

(22) Filed: Nov. 12, 1998

(30) Foreign Application Priority Data

| Nov. 13, 1997 | (JP) | 9-311901 |
| Nov. 28, 1997 | (JP) | 9-328306 |
| Mar. 12, 1998 | (JP) | 10-061215 |
| May 15, 1998 | (JP) | 10-133335 |
| May 26, 1998 | (JP) | 10-144264 |

(51) Int. Cl.[7] ............................................. H04N 7/18
(52) U.S. Cl. ..................................... 348/149; 348/149
(58) Field of Search ................................. 348/143–158

(56) References Cited

U.S. PATENT DOCUMENTS

| 5,041,828 A | * | 8/1991 | Loeven ........................ 340/937 |
| 5,530,441 A | * | 6/1996 | Takatou et al. ............... 340/937 |
| 5,646,853 A | * | 7/1997 | Takahashi ..................... 364/436 |
| 5,761,326 A | * | 6/1998 | Brady et al. .................. 382/103 |
| 5,886,738 A | * | 3/1999 | Hollenbeck et al. .......... 348/151 |
| 5,948,038 A | * | 9/1999 | Daly et al. .................... 701/117 |
| 6,100,819 A | * | 8/2000 | White ........................... 340/933 |
| 6,188,329 B1 | * | 2/2001 | Glier et al. ................... 340/937 |
| 6,188,778 B1 | * | 2/2001 | Higashikubo et al. ........ 382/104 |
| 6,223,125 B1 | * | 4/2001 | Hall .............................. 701/301 |

* cited by examiner

Primary Examiner—Andy Rao
(74) Attorney, Agent, or Firm—Antonelli, Terry, Stout & Kraus, LLP

(57) ABSTRACT

A traffic surveillance system for surveillance conditions of traffic at a traffic strategic point such as an intersection. The surveillance system has at least one traffic signal light having a housing which contains one set of traffic lights, installed at the traffic strategic point, a television camera adapted to image-pick up the traffic strategic point, and a television monitor for displaying a video signal from the camera. Lighting information of the traffic signal light and the video signal from the television camera are synthesized and displayed on the same screen of the television monitor.

13 Claims, 24 Drawing Sheets

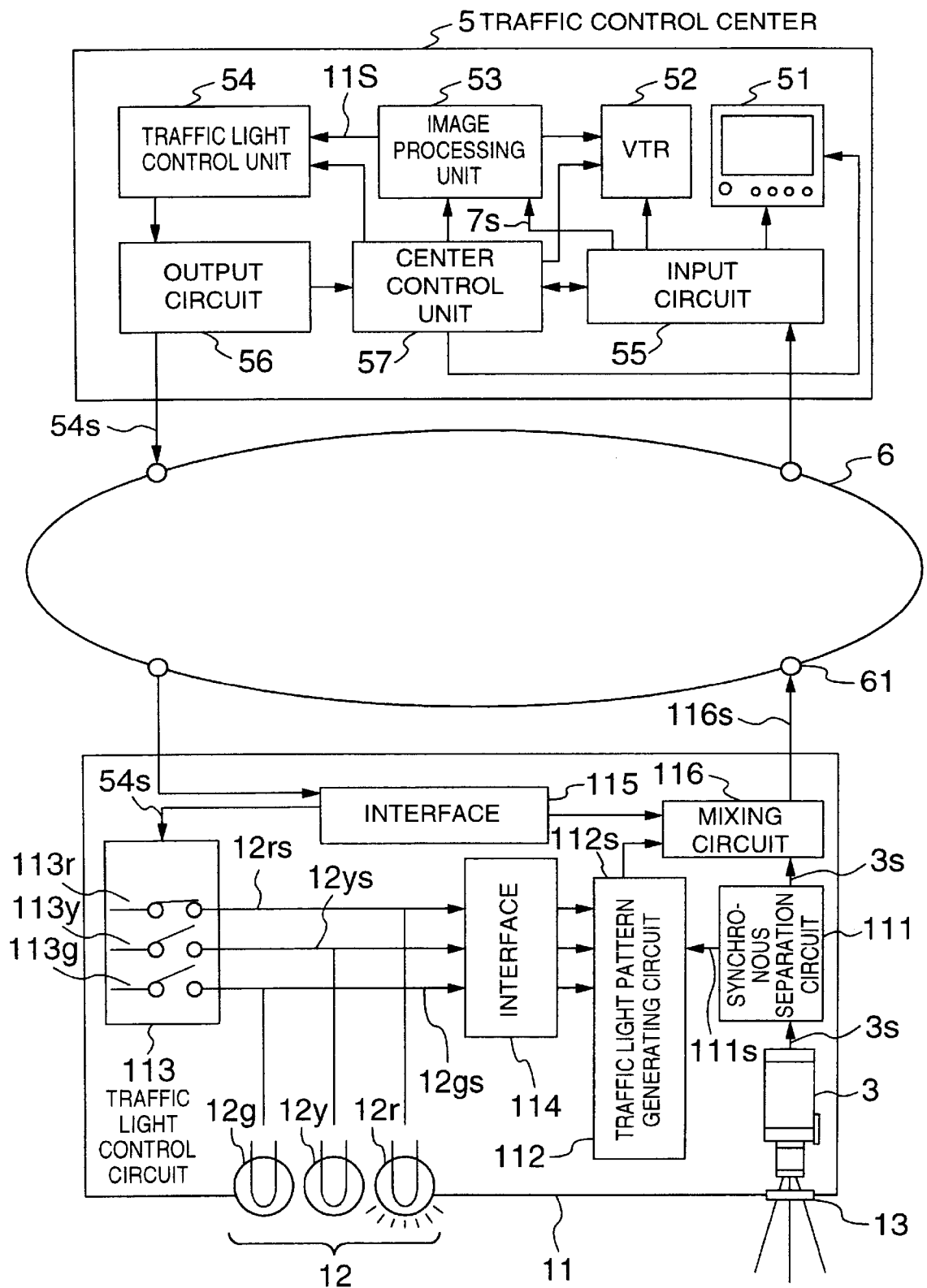

TRAFFIC SURVEILLANCE SYSTEM

BACKGROUND OF THE INVENTION

The present invention relates to a video-based traffic surveillance system and more particularly to a system for surveilling a traffic strategic point such as an intersection, pedestrian crossing or the like by using a television (TV) camera.

FIG. 13 shows a conventional surveillance system which aims to surveille traffic at an intersection and its neighboring area by using a TV image. On the TV system in this figure are shown conditions of typical installation near an intersection of the surveillance system. On the other hand, FIG. 16 is a perspective view drawn from a photograph taken of an actual intersection and its neighboring area. Referring to the two figures, there are illustrated traffic signal lights proper 1, 1'N, traffic signal light posts 21, 2E, 2W, 2S and 2N (E, W, S and N represent directions, respectively), a housing 33 of a surveillance TV camera 3 as depicted in FIG. 14, and a post 4 of the surveillance TV camera 3. Denoted by 35 is a hold arm. The traffic signal lights are installed at east, west, south and north ends of the intersection in correspondence to passing directions of vehicles but for convenience of illustration, only bases of the posts 2E, 2W and 2S are depicted for the traffic signal lights at the east, west and south ends.

In FIG. 13, buildings near the intersection, passing vehicles and pedestrians are omitted for convenience of illustration, too, and arrows on the road surface do not imply traffic regulation but indicate passing directions of vehicles.

The surveillance TV camera 3 is constructed as shown in FIG. 14. More particularly, the TV camera proper 3 aiming at performing surveillance in all directions at the intersection is combined with a motor-driven zoom lens 31 to form a structure which is carried on a pan and tilt head 32. To permit surveillance in all kinds of weather, the structure is contained in the camera housing 33. Denoted by 34 is a carriage which is mounted to the hold arm 35 of the surveillance TV camera post 4.

The surveillance TV camera 3 is mounted at a position which is determined by taking into account such points that as shown in FIG. 16, drivers in passing vehicles do not have difficulties in visually recognizing the traffic signal light proper, the view field of the TV camera is not disturbed by a nearby traffic signal light and the TV camera is allowed to have an unobstructed distant view.

FIG. 15 shows a typical example of an image obtained from the surveillance TV camera (corresponding to an image from the TV camera 3 installed near the traffic signal light 1'N in FIG. 13). In this example, the direction of the TV camera is so adjusted that the confrontal traffic signal light 1S (not shown) can be viewed within the view field in order that the traffic flow near the intersection can be surveilled remotely. Further, when the image is recorded on a video tape recorder (VTR), not shown, the recorded image can be utilized to analyze causes of a traffic accident. But because of the aforementioned constraint imposed on the mount position, the TV camera is installed at only one corner, bringing about the following disadvantages.

(1) The pan and tilt head and the motor-driven zoom lens are used in combination to permit unobstructed views of all corners and as a result, the surveillance TV camera 3 and the housing 33 are increased in size. Accordingly, the surveillance TV camera post 4 needs to be highly rigid, leading to an increase in cost.

(2) In the example shown in FIG. 13 in which the TV camera 3 is installed at the north end of the intersection, a view field in the south direction can be ensured as shown in FIG. 15 but vehicles passing in the east and west directions are liable to be shaded by buildings and the traffic flow on this side lane. Especially, vehicles directly underneath and behind (northward) the surveillance TV camera 3 cannot at all be recognized.

(3) It fails to make traffic conditions in the all directions related to each other by having unobstructed views in the all directions at a time.

(4) When the TV camera manages to get a view of the confrontal traffic lights, it is difficult for the TV camera to ensure a view of an underneath area inside the intersection. If the traffic lights are viewed at an edge of the view field in order to get a wide view of the underneath area as illustrated in FIG. 13, the view field may sometimes deviate from the traffic lights in a heavily windy weather because both the camera and the traffic lights swing. Further, the view of the traffic lights is reduced in scale to make it difficult to discriminate colors.

In spite of the aforementioned disadvantages, the surveillance TV camera is installed at only one corner of the intersection. Presumably, this is because if TV cameras are installed at individual corners, the sidewalk will be jammed with not only illumination posts (not shown) and traffic signal light posts but also the surveillance TV camera posts and consequently the sidewalk area will be narrowed to disturb passage of pedestrians. In addition, the scenic beauty of city will be spoiled.

An example for elimination of the disadvantage in (2) above is available in which the surveillance camera post is installed closer to the intersection than the traffic signal light post and the arm 35 is extended up to the center of the intersection as shown in FIG. 16. In this instance, however, the disadvantages in (1) and (4) above are conversely aggravated. In the example shown in FIG. 16, a structure is employed which permits a person to easily access the TV camera for the purpose of maintenance and in that case, both the post and the arm are required to be high in strength and are necessarily increased in size.

When an image of the surveillance TV camera is desired to be used, for multi-purpose, as a part of an advanced traffic control system, conditions of traffic flow in all directions at an intersection and its neighboring area must be grasped simultaneously from an optimal position. To this end, one solution is to install surveillance TV cameras at the individual corners. But if this is realized by installing the traffic signal light and the surveillance TV camera independently of each other as in the case of the prior art, disadvantages of the disturbance of passage of pedestrians and the spoilage of the scenic beauty of city will be actualized. Therefore, a method for camera installation which can eliminate these disadvantages is desired.

Conventionally, another system is available which automatically measures speed violation but as far as violation of traffic lights is concerned, the arrest of a flagrant offender by visual inspection prevails predominantly. In the arrest of a flagrant offender by visual inspection, it is necessary for a person who exposes a violator to always surveille the appearance of a violative vehicle by repeating such an operation as watching a light indication of a traffic signal light and then watching a predictive area in which the violative vehicle will appear. As will be seen from the above, the conventional system raises problems that the arrest of a violative vehicle is carried out by having resort to manual inspection to increase personnel expenses, all traffic signal lights cannot be surveilled, no evidence for traffic light violation is left behind, judgement during transition of a change of the traffic light tends to be obscure and determination of a violation area becomes obscure, thus making a judgement miss liable to occur. Further, in the conventional system in which the traffic signal light and the surveillance TV camera are installed independently of each other, the total of costs of installation of equipments tends to be comparatively high and traffic regulations practiced during installation work and maintenance/inspection have a great influence upon traffic.

Summary of the Invention

The present invention contemplates elimination of the conventional problems as above and it is an object of the present invention to provide a traffic strategic point surveillance system based on a TV camera which can also be applicable to an advanced traffic control system.

The advanced traffic control system referred to herein is a system which using an image of a surveillance TV camera in combination with image processing techniques, optimize traffic signal lights control by automatic detection of passing vehicle speed, vehicle congestion, avoide the obstacles, length of traffic jam, and travel time measuring by license plate recognition, and prevent a traffic accident occurring by automatic detection of illegal parking vehicles.

Another object of the present invention is to provide a surveillance TV system capable of obtaining an image of high utilization value which is also utilizable in the advanced traffic control system by fetching information of traffic lights at individual corners into images of individual surveillance TV cameras.

When the traffic lights and the surveillance TV camera are installed close to each other or contained in the same housing so that a lighting color of the traffic lights may be superimposed on an image of the surveillance TV camera every moment so as to be displayed at a corner of the image, running conditions of vehicles in each direction can be analyzed every moment in association with the state of the traffic lights. Further, the surveillance TV camera need not catch the confrontal traffic lights in its view field, because, unlike prior art Surveillance TV camera which is required to be so set as to allow the confrontal traffic lights to be caught in its view field as shown in FIG. 15, the confrontal traffic lights are picked up by another means in the present invention and the traffic lights thus picked up are superimposed on an image being taken by the surveillance TV camera and the colors of the traffic lights are displayed at a corner portion of the image, whereby the degree of freedom of view-field adjustment can be increased, so that a view field inside the intersection which is important for analysis of a traffic accident can especially be ensured, thus providing an image of traffic flow of high utilization value.

Preferably, in the present invention, by using a TV camera, a video recording unit such as a VTR and image processing techniques, an image of a traffic light violative (light neglecting) car and the traffic lights may be recorded simultaneously and automatically in synchronism with a change in the traffic lights with the aim of efficiently proving traffic light violation.

As necessary, in the present invention, installation of surveillance TV cameras at the individual corners can be realized to solve the conventional problems described previously by making the traffic lights integral with each surveillance TV camera to permit a single post to be used in common for the traffic light post and the surveillance TV camera post.

When the surveillance TV cameras are installed at the individual corners of an intersection and video outputs of the cameras are displayed on individual TV monitors arranged on a display board of a traffic control center, intuitional grasp of actual traffic conditions at the intersection is difficult to achieve depending on the relation between a screen displayed on the monitor and a direction in which the TV camera is image-picking up. For example, when the screen displayed on the monitor is inverse to or 90° differs from the direction of image-picking up by the TV camera on the display board, the direction must be displaced for consideration in order to concretely grasp conditions of the intersection, giving rise to very troublesome work. Accordingly, in the traffic control center, it is difficult for persons concerned, except experts, to intuitionally grasp the state of traffic flow passing through the intersection from such a map type (geographic) display board as above.

The present invention also intends to eliminate the above disadvantage and still another object of the present invention is to provide a surveillance TV system in which directions of images of the respective TV cameras displayed on the respective TV monitors coincident with directions on the map regardless of surveillance directions of the respective TV cameras to enable even an inexperienced person to intuitionally grasp the traffic flow. In other words, in the present invention, directions on the screen display are made to coincide with directions on the map.

For example, according to the present invention, in a TV system which comprises a plurality of TV cameras and a plurality of TV monitors to surveille and record the traffic flow by displaying images of a traffic strategic point such as an intersection on the TV monitors at a time, the plurality of TV cameras for image-picking up the intersection preferably image-pick up an area inside the intersection and roads extending forwards from the intersection to prevent the dead angle from occurring and images of the respective TV cameras are displayed on the respective TV monitors in such a manner that directions of the displayed images of the respective TV cameras are made to coincide with directions on the map type information board regardless of the surveillance directions of the respective TV cameras.

Further, according to the present invention, in a TV system which comprises a plurality of TV cameras and a plurality of TV monitors to surveille and record the traffic flow by displaying images of a traffic strategic point such as an intersection at a time, one of the TV cameras for image-picking up an area in a first direction of the intersection preferably has a longitudinally elongated screen and an area inside the intersection and a road ahead of the intersection are picked up by this TV camera in a manner which provides no dead angle. Another TV camera has its share of the image-picking up range for image-picking up a road ahead of the intersection in a second direction orthogonal to the first direction. Further, images of the respective TV cameras displayed on the respective TV monitors are preferably arranged on a single screen in such a manner that directions of the images coincide with directions on a map of the map type information board regardless of surveillance directions of the respective TV cameras, with the result that the image of the respective road portions picked up by the respective TV cameras have images sizes which approximate with respect to each other on the single screen.

When the image of the surveillance TV camera is utilized, for multi-purpose, as a part of the advanced traffic control system, it is more desirable to have a bird-eye's view of traffic flow conditions in all directions at the neighboring area of an intersection. In the aforementioned system of the present invention in which the traffic signal lights and the surveillance TV cameras are installed independently for each direction, however, the degree of improvements in elimination of the disturbance of passage of pedestrians and the spoilage of the scenic beauty of city is limited.

Accordingly, still another object of the present invention is to provide a surveillance TV system capable of obtaining an image of higher utilization value which can also be utilized in the advanced traffic control system by taking bird-eye's views in all directions at the intersection at a time and fetching information of traffic lights into one surveillance TV camera.

By displaying a lighting color of traffic lights together with an image of the surveillance TV camera in accordance with the traffic flow every moment, running conditions of vehicles can be analyzed in association with the state of the traffic lights. Further, when the surveillance TV camera need not catch the confrontal traffic lights in its view field, the degree of freedom of view field adjustment is increased and a view of the entire area inside the intersection, which is important especially for analysis of a traffic accident, can be ensured, thus providing an image of traffic flow which is of high utilization value.

BRIEF DESCRIPTION OF THE DRAWINGS

FIG. 2 is a block diagram showing an embodiment of a traffic surveillance system according to the present invention.

DESCRIPTION OF THE PREFERRED EMBODIMENTS

Figure 1:
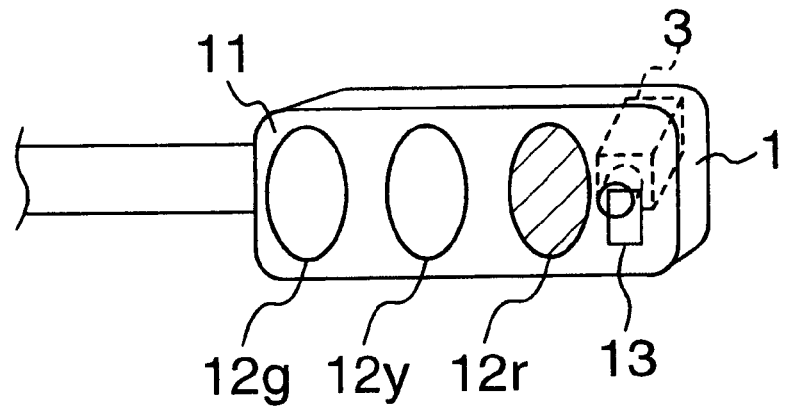
FIG. 1 is a perspective view showing an embodiment of a traffic signal light according to the present invention.

The invention will now be described by way of example with reference to the accompanying drawings. In connection with the following description, like members are designated by like reference numerals throughout the drawings.

Referring to FIG. 1, an embodiment of a traffic signal light according to the present invention is constructed as shown therein.

In FIG. 1, there are seen the traffic signal light as designated by reference numeral 1, a traffic light housing 11 in which a green traffic light 12g, a yellow traffic light 12y and a red traffic light 12r are mounted, and a surveillance window 13 of a surveillance TV camera 3 built in the housing.

The present embodiment presupposes that surveillance TV cameras are built in the housings of east, west, south and north traffic signal lights and therefore, each surveillance TV camera need not be changed in view angle and direction after installation or during use and does not require any motor-driven zoom lens and pan and tilt head. But this construction may be changed as necessary. Accordingly, the TV camera 3 suffices to be a small-sized and light-weight one and can therefore be contained in the traffic light housing 11. With the traffic signal light as above used, any post dedicated to the surveillance TV camera need not be installed and hence, installation of many TV cameras in respective directions can be facilitated to solve the problem that photographing is disturbed by buildings and the traffic flow in the reverse lane and the dead angle such as an area directly underneath the TV camera and an area behind the TV camera can be recognized by a different TV camera. Further, unobstructed views in all directions can be obtained at a time and mutual traffic conditions can be related to each other. Furthermore, thanks to the elimination of any post dedicated to the TV camera, the sidewalk can be widened to increase the passing range of pedestrians, so that the dead angle as viewed from vehicles can be reduced and good results can be obtained from the standpoint of the scenic beauty.

Turning now to FIG. 2, there is illustrated in block form an embodiment of a traffic surveillance system according to the present invention. A traffic signal light used in the present embodiment is the traffic signal light as shown in FIG. 1 which contains the TV camera 3 in the traffic light housing 11. Typically, the intersection is provided with four traffic signal lights but for simplification of explanation, only one of them is illustrated in the figure.

The system shown in FIG. 2 comprises a traffic control center 5, a traffic control network 6 comprised of cables or optical fibers, and a housing 11 of the aforementioned traffic signal light. The traffic control center 5 includes a center control unit 57 for controlling the whole of the center, an input circuit 55 for receiving video information from the TV camera of each traffic signal light, an output circuit 56 for transmitting a control signal including synchronization information for control of the network and control signals for traffic lights, a monitor 51 for displaying an image from the TV camera 3 obtained by image-picking up intersection conditions, an image processing unit 53 for grasping jam conditions and the like from the image of the TV camera 3 to form light control information, and a traffic light control unit 54 for generating signals for controlling traffic lights 12 from the information from the image processing unit 53. On the other hand, the traffic signal light housing 11 contains, in addition to the traffic lights 12, a surveillance TV camera 3, a synchronous separation circuit 111 for video signals, a traffic light pattern generating circuit 112, a traffic light control circuit 113 for controlling the traffic lights 12, an interface circuit 114 for supplying a signal from the traffic light control circuit 113 to the traffic light pattern generating circuit 112, and a mixing circuit 116 for mixing the video signal from the TV camera 3 and a traffic light pattern signal from the traffic light pattern generating circuit 112 and delivering a mixed signal 116s through a terminal 61 in accordance with a network synchronizing signal obtained from the synchronization information from the traffic control center 5. The housing 11 also contains an interface 115. The interface 115 is adapted to produce a network synchronization signal, supplied to the mixing circuit 116, from the control signal 54s delivered out of the traffic control center 5. The interface 115 also produces a traffic light control signal supplied to the traffic light control circuit 113.

Next, the operation of the above system will be described.

In FIG. 2, a video signal 3s transmitted from the surveillance TV camera 3 in the traffic light housing 11 is supplied to the synchronous separation circuit 111 and a video synchronizing signal 111s obtained from the synchronous separation circuit 111 is supplied to the traffic light pattern generating circuit 112. Traffic light control switches 113r, 113y and 113g in the traffic light control circuit 113 switch and light a red traffic light 12r, a yellow traffic light 12y and a green traffic light 12g and in the figure, a state in which the red traffic light 12r is lit is illustrated. The traffic light control circuit 113 is operated by receiving, through the traffic control network 6, the traffic light control signal 54s transmitted from the traffic light control unit 54 in the traffic control center 5. Next, the operation of the light control circuit 54 for forming the traffic light control signals will be described. An image 7s from TV camera 3 which is received by the image processing unit 53 is subjected to such a process as image recognition in that unit and transmitted, as information 11s such as a length of traffic jam, to the traffic light control unit 54. The traffic light control unit 54 determines a signal switching timing effective to alleviate or eliminate a traffic jam on the basis of that information and delivers a traffic light control signal. Acquisition of the length of traffic jam from the video information can be realized with ease through well-known techniques. For example, one may refer to "Traffic Flow and Congestion Measuring System by Image Processing" by T. Kitamura et al, pp. 293–296, $2^{nd}$ Symposium on Sensing via Image Information (SII'96) Jun. 13–14, 1996;

"Traffic Flow Visualization and Control (TFVC) Improves Traffic Data Acquisition and Incident Detection", by T. Hill et al, pp. 1–11, Third Annual World Congress on Intelligent Transport Systems, Oct. 14–18, 1996;

"Traffic Queue Length Measurement Using an Image Processing Sensor", by M. Higashikubo et al, Third Annual World Congress on Intelligent Transport Systems, Oct. 14–18, 1996; and "A Method for Measuring the Length of a Traffic Jam Using Images", by F. Ueda et al, Third Annual World Congress on Intelligent Transport Systems, Oct. 14–18, 1996.

Transmission and reception of the traffic light control signal and transmission and reception of the video signal can also be realized through well-known techniques. Further, through the medium of the image processing, the image processing unit can also be used as a sensor for detecting the occurrence of a traffic accident. An accident detection signal from the image processing unit can be superimposed so as to be recorded on a VTR. Control of the recording unit will be detailed hereinafter.

Techniques disclosed in U.S. Ser. No. 08/839227 assigned to the same assignee and entitled "Digital Transmission Network", filed on Apr. 23, 1997, the disclosure of which is hereby incorporated by reference, may be applied to the image transmission and the video signal transmission and reception in the network 6.

Next, the image to be displayed on the monitor 51 of the traffic control center 5 will be described. Lighting signals 12rs, 12ys and 12gs for the red traffic light 12r, yellow traffic light 12y and green traffic light 12g are supplied to the traffic light pattern generating circuit 112 through the interface 114. Then, by the action of the synchronizing signal 111s, a traffic light pattern signal 112s synchronous with the video signal 3s from the TV camera 3 is delivered out of the circuit 112. In the mixing circuit 116, the video signal 3s is mixed with the traffic light pattern signal 112s. The video signal 116s containing the traffic light pattern is then delivered out of the mixing circuit 116 to the traffic control network 6 in synchronism with the synchronizing signal of the network supplied from the interface 115. This video signal is supplied to the video monitor 51 and a VTR 52 in the traffic control center 5 via the traffic control network 6 and input circuit 55 and utilized for visual confirmation of traffic conditions. A state of the traffic lights is patterned so as to be displayed on the monitor 51. This pattern is depicted in FIG. 3.

Figure 3:
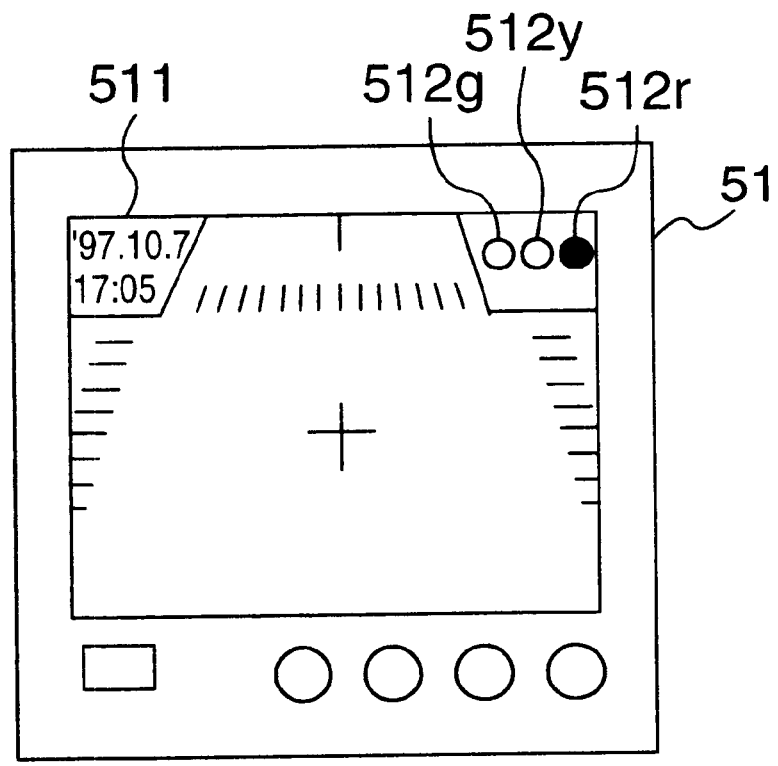
FIG. 3 is a diagram showing an embodiment of a monitor screen according to the present invention.

In FIG. 3, relative positions of the respective traffic lights are represented by small circles. Only a circle corresponding to a lit traffic light is colored by a lighting color of that traffic light. Thus, as shown in the figure, a pattern 512r corresponding to the lit red traffic light 12r is displayed in red and patterns 512g and 512y corresponding to the unlit traffic lights 12g and 12y are displayed in the form of mere blank circles indicative of positions. The display positions of the traffic light patterns 512r, 512g and 512y can be moved to desired positions which do not disturb the traffic flow image. Year, month, day and hour, generally designated by 511, are displayed on the left side of the screen.

With the monitors as above disposed in four directions of east, west, south and north, by comparing indications on the respective monitors disposed in the respective directions, running conditions of vehicles in the respective directions can be analyzed every moment in association with switching of the traffic lights.

In the present embodiment, for convenience of explanation, the patterns 512r, 512g and 512y are described as being superimposed on the video signal, but the synthesis and superimposition is not always necessary and these patterns may be transmitted as separate signals which are displayed on a small window at a corner of the screen. The traffic control network 6 may also be connected not only to a different traffic signal light (not shown) and a different TV camera (not shown) at the same intersection but also to a system at a different intersection and a police station.

Figure 4:
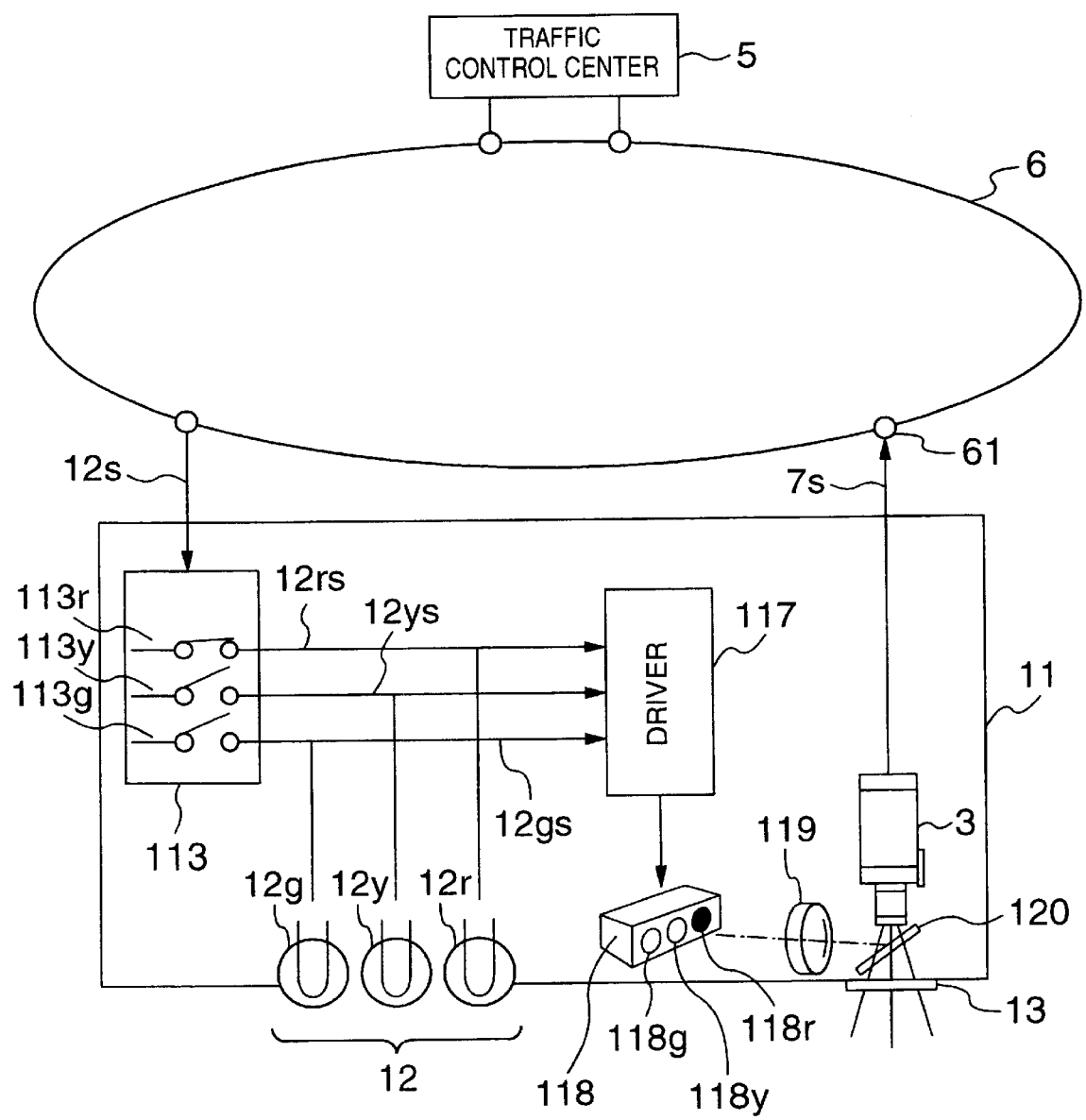
FIG. 4 is a block diagram showing another embodiment of the traffic surveillance system according to the present invention.

Referring to FIG. 4, there is illustrated, in block form, another embodiment of the traffic surveillance system according to the present invention.

In the present embodiment, a traffic light display unit 118 is provided in a housing 111 and a half mirror 120 is inserted in the optical path of a surveillance TV camera 3 in order that the traffic light display unit 118 can be imaged together with an image of an intersection so as to be displayed on a part of the screen. Denoted by 119 is a focal position correcting lens. In the display unit 118, small display lights 118r, 118y and 118g corresponding to the respective traffic lights are lit in accordance with lighting signals 12rs, 12ys and 12gs and the operation and effect similar to that in the first embodiment can be obtained. Denoted by 117 is a driver for the small display lights. Small lamps or LED's may be used as the small display lights 118r, 118y and 118g.

In the present embodiment constructed as above, the mixing circuit for electrically synthesizing or combining the video signal and the traffic light signal can be dispensed with and information of the traffic lights is optically superimposed on the image of the intersection. As a result, the circuit construction in the traffic signal light housing can be simplified.

Figure 5:
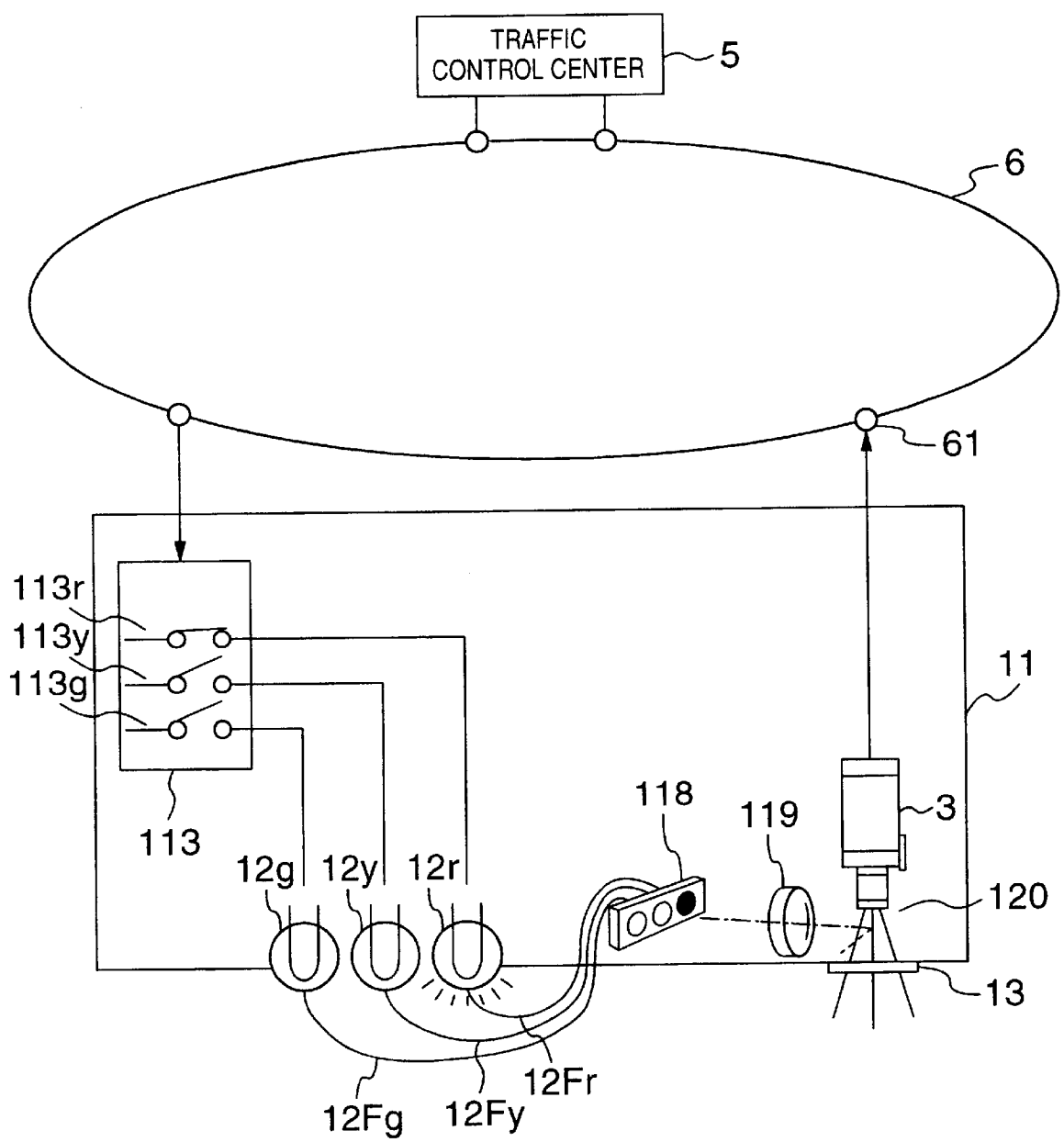
FIG. 5 is a block diagram showing still another embodiment of the-traffic surveillance system according to the present invention.

Referring to FIG. 5, still another embodiment of the traffic surveillance system is illustrated in block form.

In the figure, rays of light of green traffic light 12g, yellow traffic light 12y and red traffic light 12r are partly received at one end of individual optical fibers 12Fg, 12Fy and 12Fr and the other end of the individual optical fibers is arranged in a display unit 118 as shown in FIG. 5. A half mirror 120 is inserted in the optical path of a surveillance TV camera 3 in order that the display unit 118 can be imaged and displayed at a part of the screen. The driver 117 can be unneeded. With this construction, the operation and effect similar to that in the previous embodiments can be obtained.

In the foregoing embodiments, the traffic control center 5 is described as performing control of all intersections but dispersed control may be used for signal control. For example, the monitors may be provided in the traffic control center but the control unit for traffic lights may be provided either at each intersection or in each area including a plurality of intersections.

In the foregoing embodiment, the traffic control network is realized with a time-division digital information transmission unit using the synchronizing information but it is not limited thereto and may use frequency multiplex transmission or multiplex transmission based on optical fiber.

Figure 6:
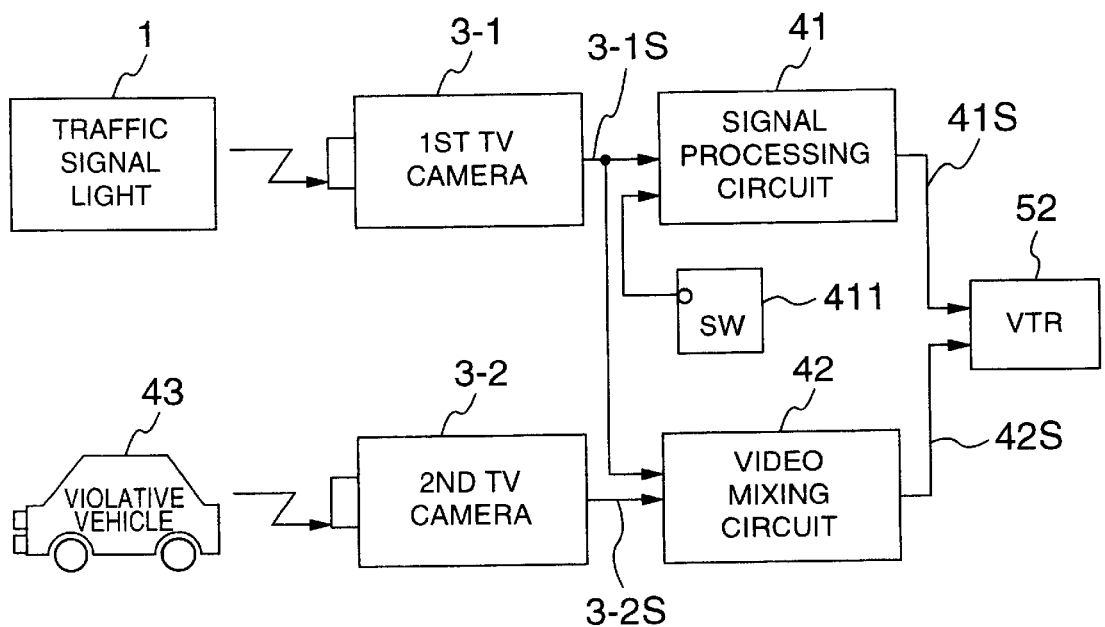
FIG. 6 is a block diagram showing an embodiment of a traffic lights violator surveillance system according to the present invention.

Referring to FIG. 6, there is illustrated in block form an embodiment of a traffic light violator surveillance system according to the present invention.

The present embodiment is especially directed to a traffic strategic point surveillance TV system suitable for detecting a vehicle which is violative of traffic lights at an intersection. The system of the present embodiment comprises a first TV camera for image-picking up a traffic signal light, a second TV camera for image-picking up a violative car, a signal processing circuit for generating a control signal synchronous with traffic lights, a recording unit such as a VTR controlled by the control signal, and a mixing circuit adapted to synthesize or combining output signals of the first and second TV cameras and connected to the recording unit.

In FIG. 6, there are illustrated a first TV camera 3-1, a video output signal 3-1S, a signal processing circuit 41, a VTR control signal 41S, a second TV camera 3-2, a video output signal 3-2S, a video mixing circuit 42, a video output signal 42S and a violative vehicle 43. In the figure, a traffic signal light 1 periodically changes traffic lights to designate a traffic light. The first TV camera 3-1 photographs a traffic light indicated by the traffic signal light 1. The first TV camera 3-1 sends its video output signal 3-1S to the video mixing circuit 42 and signal processing circuit 41. The signal processing circuit 41 separates signals of red (R), green (G) and blue (B) colors from the received video output signal 3-1S to detect a change in traffic lights and generates the VTR control signal 41S synchronous with the traffic lights. The VTR control signal is sent to a VTR 52. The VTR control signal may also be generated by depressing a push button switch 411. On the other hand, the second TV camera 3-2 image-picks up an area in which there is no detectable object other than at least a car which is violative of traffic lights of the traffic signal light 1. The video output signal 3-2S of the second TV camera 3-2 image-picking up the violative vehicle 43 is mixed with the video output signal 3-1S of the first TV camera 3-1 image-picking up the traffic lights in the video mixing circuit 42. The video output signal 42S of the video mixing circuit 42 is applied to the VTR 52. The VTR 52 is controlled by the VTR control signal 41S synchronous with a change in the traffic lights of the traffic signal light 1 and consequently, at each timing that no car other than the traffic violative vehicle exists, the violative vehicle 43 and the traffic lights at that timing can be recorded at a time. In other words, a vehicle which exist at a timing that for example, the red traffic light is lit and any vehicle should not essentially exist can be recorded. This will be described more specifically. For example, at a push-button responsive pedestrian crossing set up at a trunk road, an object calling a vehicle driver's attention is pedestrians and so, even at the time that the traffic lights change to the red light through a transition state while giving sufficient time for the vehicle driver to stop, the vehicle driver sometimes neglects the red light and passes through the pedestrian crossing. Presumably, this is due to the fact that because the pedestrian crossing is not an intersection at a crossing of trunk roads and the collision between vehicles does not occur at the pedestrian crossing, the vehicle driver considers himself or herself safe. This behavior is, however, very dangerous for pedestrians being about to go across the pedestrian crossing. In the present embodiment, for example, a signal generated by operating the aforementioned push button 411 is used as the VTR control signal 41S to control the start of recording of the VTR 52 and road conditions at that time are image-picked up by the second TV camera. If a violative vehicle 43 is present at that time, it will be image-picked up by the second TV camera 3-2 and recorded on the VTR 52, along with an image of the traffic signal light 1 photographed by the first TV camera 3-1. Control of recording by the VTR will be described later in detail. In the case of a typical intersection, the VTR control signal 41S is generated when the yellow traffic light is lit and the image-pickup direction of the second TV camera 3-2 is directed to the travelling direction of passing vehicles in order that running of vehicles at the time of traffic light transition can be image-picked up. At that time, the state of the traffic signal light 1 is also image-picked up and if the location of an image-picked up vehicle is inside the intersection, that vehicle will be proven to be a violative one. Since all of these images are recorded on the VTR 52, the violative vehicle can be found out later on by reproducing the images.

In the present embodiment, by installing the second TV camera 3-2 in the traffic signal light housing 11 as shown in FIG. 1 and mixing lighting conditions of the traffic signal light with an image picked up by the second TV camera IN instead of the first TV camera 3-1 as in the case of the embodiments shown in FIGS. 4 and 5, the first TV camera can be omitted. In this case, the costs for realization of the present embodiment can be reduced.

Figure 7:
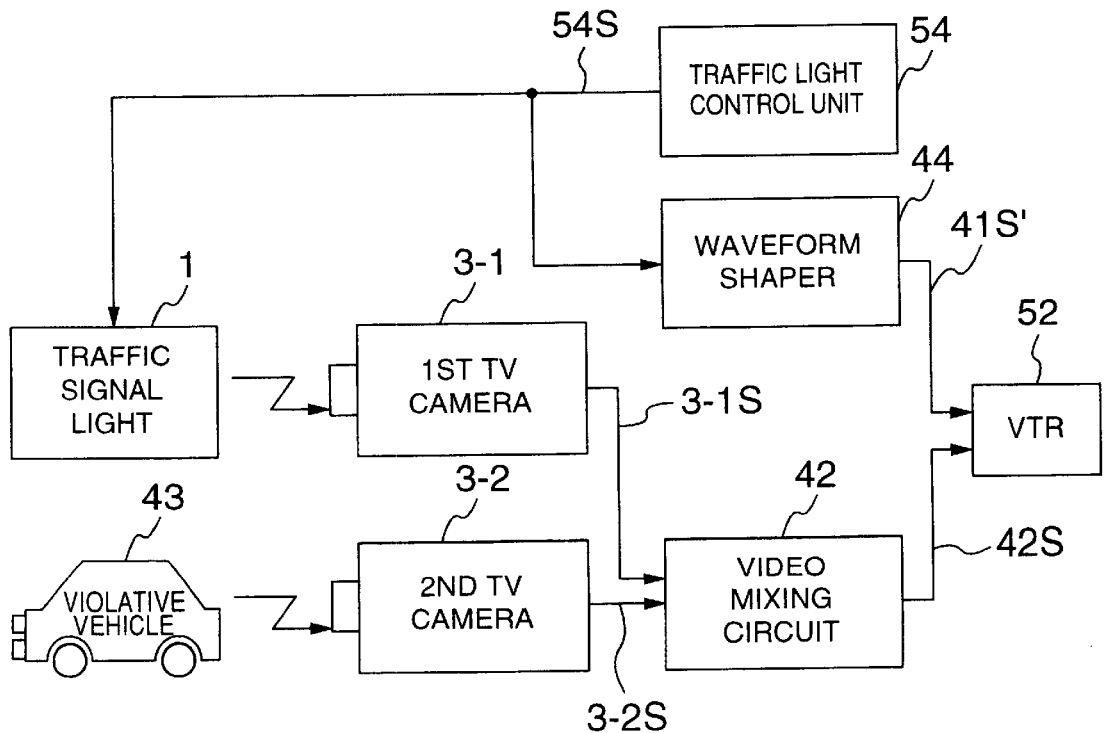
FIG. 7 is a block diagram showing another embodiment of the traffic light violator surveillance system according to the present invention.

Referring to FIG. 7, there is illustrated in block form another embodiment of the signal violator surveillance system according to the present invention using a control signal for a traffic signal light as a signal synchronous to traffic light s. In FIG. 7, reference numeral 44 designates a waveform shaper.

A traffic light control unit 54 sends a control signal 54S for controlling a traffic light signal by which traffic lights of a traffic signal light 1 are changed and displayed. At the same time, the traffic light control unit 54 also supplies the control signal 54S to the waveform shaper 44. The waveform shaper 44 shapes the received control signal 54S and sends a shaped signal, as a VTR control signal 41S' synchronous to the traffic lights, to a VTR 52. Excepting the above, the operation of the present embodiment is the same as that of the FIG. 6 embodiment.

In the embodiment of FIG. 7, by recording color discriminating information for the traffic lights through the use of the control signal 54S when the VTR 52 is operated in synchronism with the control signal 54S for the traffic lights, the first camera 3-1 and the image therefrom can be omitted. In this case, for example, the traffic signal light has a housing as shown in FIG. 1 and the second TV camera 3-2 may be contained in the housing. Further, the traffic signal light 1 may be constructed as shown in FIG. 2 and the output of the mixing circuit 116 may be recorded on the VTR 52. The present embodiment has been described as being of a dispersed control system in which control of the traffic lights and recording thereof are carried out independently for each traffic signal light and each intersection but by providing the traffic light control unit 54 in the traffic control center 5 of the embodiment shown in FIG. 2 and inter-connecting the individual traffic signal lights and TV cameras through the traffic control network, an advanced traffic control and supervising system can be constructed.

Figure 8:
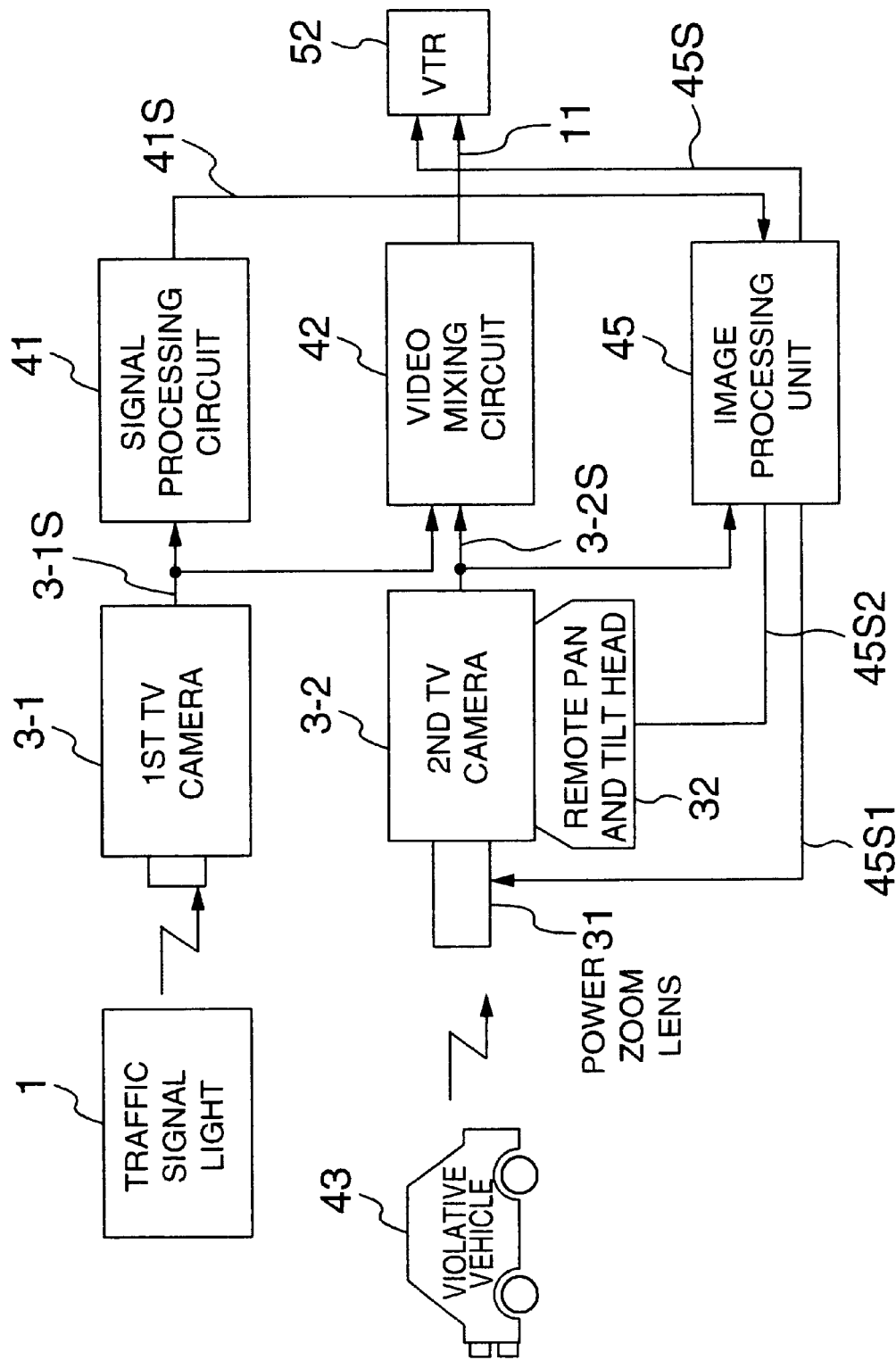
FIG. 8 is a block diagram showing still another embodiment of the traffic light violator surveillance system according to the present invention.

Referring to FIG. 8, there is illustrated in block form still another embodiment of the traffic violator surveillance system according to the present invention. The present embodiment is directed to acquisition of more accurate information about a violative vehicle by tracking the violative vehicle when the violative vehicle is detected through image recognition. In the figure, reference numeral 45 designates an image processing unit and 45S designates a video recording command pulse signal. In FIG. 8, a video output signal 3-2S of a second TV camera 3-2 image-picking up a violative vehicle 43 is supplied to both a video mixing circuit 42 and the image processing unit 45. On the other hand, a VTR control signal 41S synchronous with traffic lights of a traffic signal light 1 is also supplied to the image processing unit 45. When the image processing unit 45 determines from the aforementioned two supplied signals that the violative vehicle 43 exists, control signals 45S1 and 45S2 are supplied from the image processing unit 45 to a remote pan and tilt head 32 and a power zoom lens 31, respectively, to carry out automatic tracking and in addition, the video recording command pulse signal 45S is sent to the VTR 52 to carry out video recording effectively. The automatic tracking as above can be achieved by well-known techniques and more excellent automatic tracking techniques are described in Japanese patent application No. 10-130540 filed by the present applicant and U.S. Ser. No. 09/078521 entitled "Method for Tracking Object and Apparatus for Tracking and Monitoring Entering Object", filed by the present applicant on May 14, 1998 claiming priority based on Japanese Pat. Appln. Nos. 9-124329 and 9-226153. The disclosure of U.S. Ser. No. 09/078521 is hereby incorporated by reference.

In the present embodiment, the recording unit 52 is not always limited to the video tape (cassette) recorder but may be a unit capable of recording images such as a video disc recorder. In the violative vehicle detecting and supervising systems of FIGS. 6, 7 and 8, a well-known time lapse VTR, for example, which can control frame recording and intermittent operation in response to an external trigger signal is suitable for use as the VTR and can be effective and efficient but the VTR is in no way limited to this type. Further, as will be described later, a temporary memory (buffer) may be provided in the system to ensure that video recording can be started slightly before the traffic lights change.

As described above, by recording the contents of traffic lights of the traffic signal light in synchronism with the traffic lights and detecting and recording the presence or absence of a violative car to obtain efficient video recording images and viewing the recorded images, easy exposure of the traffic signal violative car can be realized. Accordingly, an evidence image of the traffic signal violative car can be recorded automatically, accuracy and efficiently of the exposure of traffic signal violative cars can be improved and manual labor can be omitted to promote economical advantage.

Figure 9:
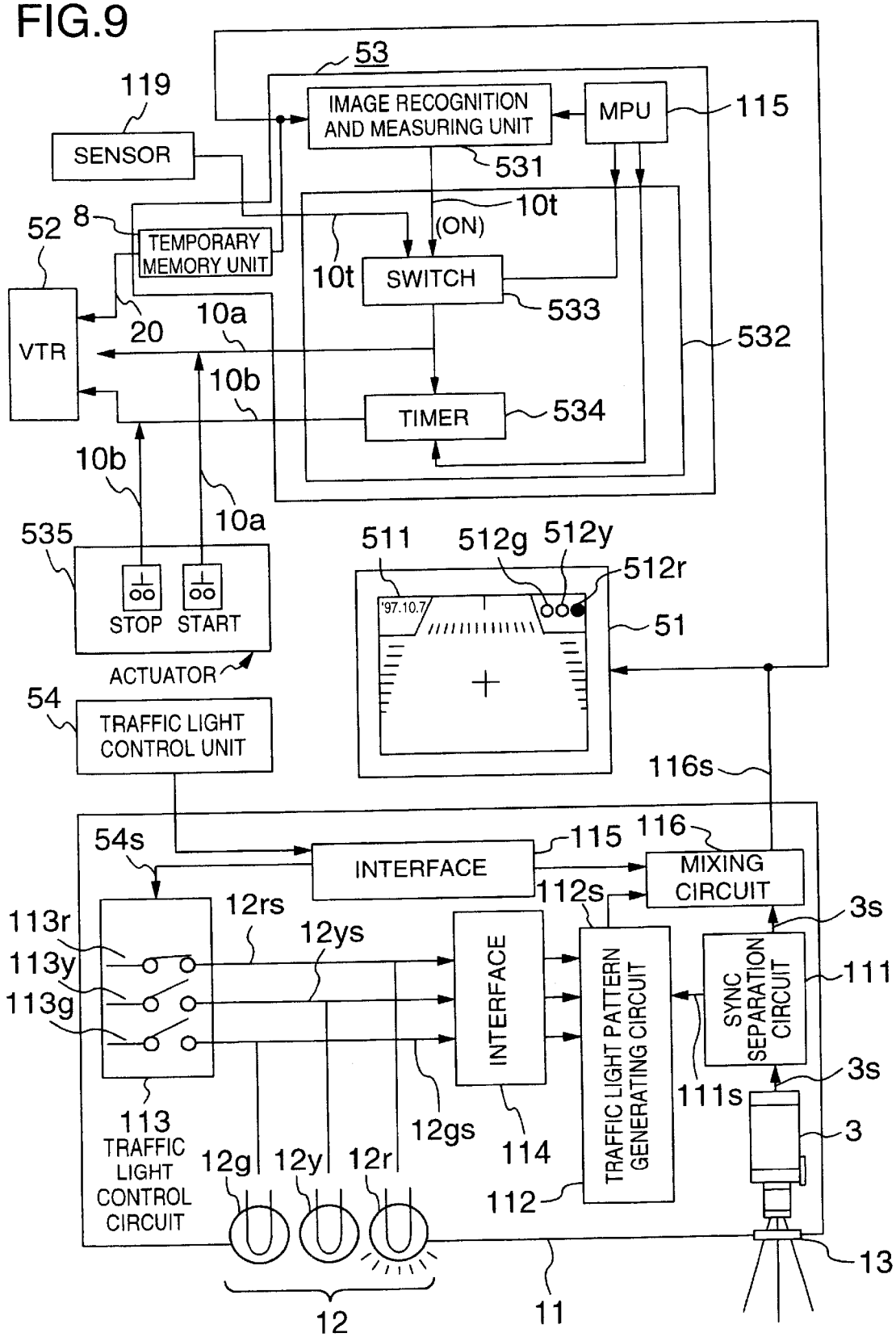
FIG. 9 is a block diagram showing still another embodiment of the traffic surveillance system according to the present invention.
Figure 10:
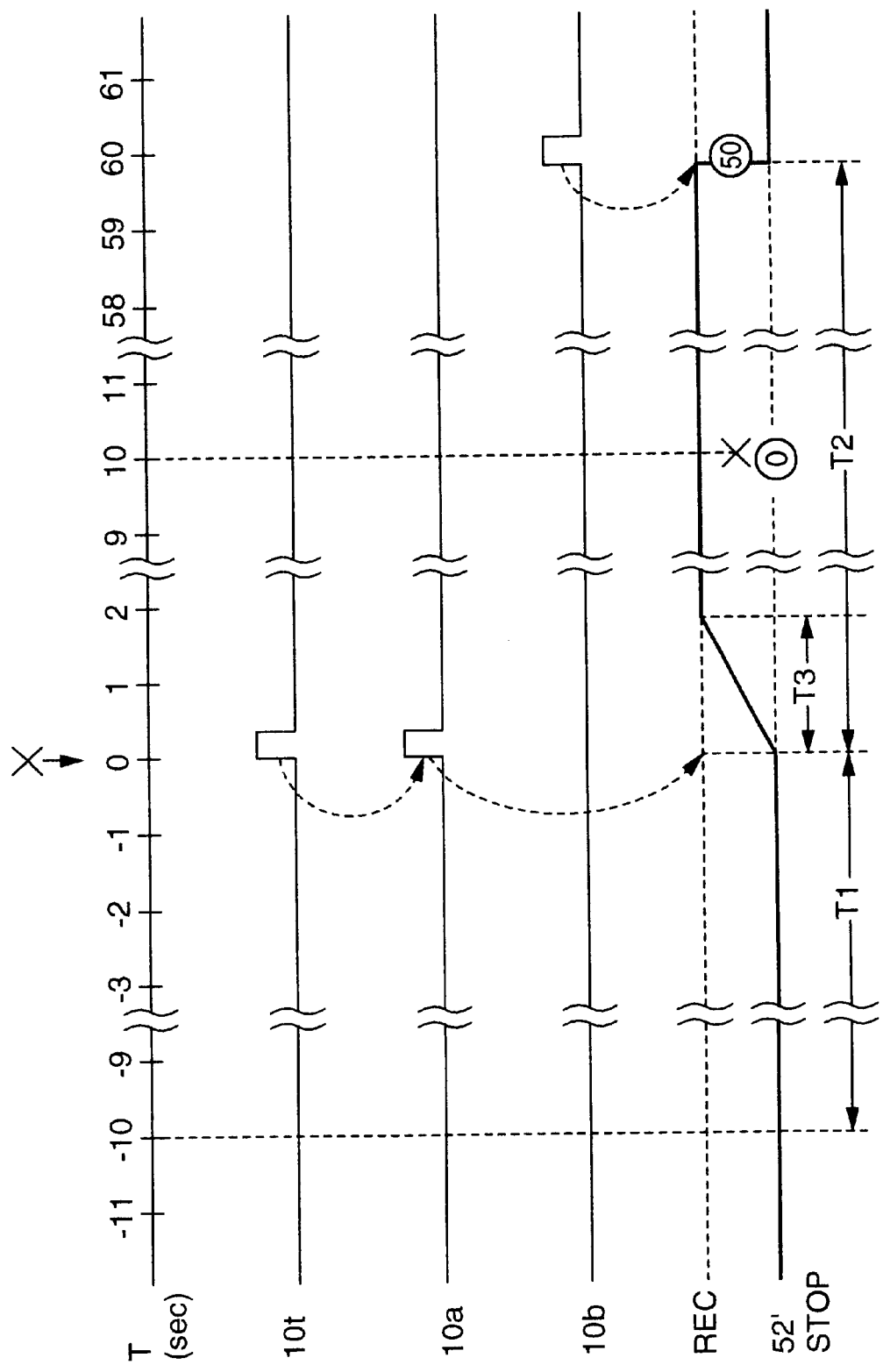
FIG. 10 is a timing chart for the FIG. 9 embodiment.

FIG. 9 is a block diagram showing still another embodiment of the traffic surveillance system. FIG. 10 is a timing chart useful to explain the operation of the present embodiment.

Referring to FIGS. 9 and 10, two methods for recording on a VTR will be described.

Firstly, a method of performing recording only when abnormality such as an accident or traffic violation is detected will be described with reference to FIGS. 9 and 10.

The timing for operation of the VTR 52 in relation to real time T is shown at 52' in FIG. 10, with the video recording state indicated by REC and the stop state indicated by STOP. Real time 0 second in the figure corresponds to an accident occurring point x. The curve 52' conceptually indicates the operation of the VTR 52 and numerical values encircled by ○ represent times T. In the figure, numerical values shown on T (sec) axis indicate times after and before (±) the real time T (=0 second) at which the accident occurs.

An abnormality detection sensor 119 and/or an image recognition and measuring unit 531 automatically recognizes abnormality (accident) and sends a detection signal 10t to a VTR control unit 532. This signal is transmitted, as a recording start signal 10a, to a VTR 52 through a switch block 533. A temporary memory unit 8 supplies a delayed video signal to the VTR 52. The above operation is controlled by a MPU 115. The provision of the temporary memory unit is necessary for the reasons as below. Typically, even when the VTR starts video recording from the stop state, video recording is actually started several seconds later than the start of the VTR. Accordingly, even if a recording start signal is generated to cause the VTR to start video recording at the time that abnormality such as an accident is detected, conditions occurring immediately before the accident and at the moment of the accident which are the most important for evidencing the traffic accident cannot be recorded. To prevent this inconvenience, a video signal which is delayed by time T1, for example, 10 seconds is supplied to the VTR 52 by means of the temporary memory unit 8. This time T1 of 10 seconds is determined on the assumption that the time immediately preceding the accident is 8 seconds and response time T3 of the VTR 52 is, for example, 2 seconds but it may be changed as necessary. The VTR 52 which starts recording in response to the recording start signal is returned to the stop state T2 seconds after the start of recording (for example, the T2 seconds inclusive of response time T3 is 60 seconds in the embodiment of FIG. 10) by means of a recording stop signal 10b transmitted from the image recognition unit 53. The T2 seconds are measured by a timer block 534 and if abnormality is again detected during the measurement (that is, during T2 seconds), the timer block 534 is reset to restart recording. Thereafter, a similar operation proceeds. An actuator 535 has the function of manually transmitting a recording start signal 10a and a recording stop signal 10b to the VTR 52 and is used when a surveillant temporarily performs the recording operation. The abnormality detection sensor 119 is, for example, an acoustic detector based on a microphone which generates the detection signal 10t when detecting an abnormal sound generated by an accident, such as an impulse sound of high sound pressure level.

In the present embodiment described as above, since conditions are recorded on the video tape only when abnormality occurs, an wasteful use of the tape can be prevented. The reproduction time can also be reduced during reproduction retrieval.

When the VTR is operated continuously, the detection signal 10t is superimposed on an image so as to be recorded on the VTR, thereby ensuring that image can be detected later with ease to permit analysis of causes of the accident. The trigger signal for the accident detection is transmitted, as a so-called well-known "index signal", to a VISS (VHS Index Search System) circuit (or the digital index and skip search function) of the VTR 52 and is recorded, as a VISS signal, on the video tape. In this case, the VTR 52 continuously records the video signal and therefore, the video signal need not be delayed and can be recorded on the video tape concurrently with the VISS signal.

The well-known VISS circuit (not shown) in the VTR 52 automatically retrieves, at a high speed, the VISS signal on the tape in the "fast forward wind" or "rewind" mode and upon detection of the VISS signal, it functions to automatically switch to the "reproduction" mode. Accordingly, with the VISS signal recorded on the video tape, even when the tape is fast forward wound or rewound during reproduction, the VTR detecting the VISS signal can resume reproduction from a portion where the VISS signal is detected and the retrieval work can be done highly efficiently. At that time, especially, in the case of "fast forward wind", it sometimes happens that a portion from which reproduction is started slightly overruns the accident occurring position depending on the type or the response characteristic of the VTR but such inconvenience can sufficiently be dealt with by a slight "reproduction rewind" when the "skip back" is used in combination. According to the present embodiment, when conditions of an accident are confirmed on the screen of the video monitor while reproducing the recorded tape, the confirmation can be carried out by repetitively operating the VTR for reproduction through the aforementioned VISS function. Further, the slow reproduction and the still function are applied in combination to only an image of accident conditions displayed in the "reproduction" mode, the accident conditions can be inspected in greater detail. Since an unwanted portion on the tape is automatically fed in the "fast forward wind" or "rewind" mode, the confirmation work can be completed within a very short time.

Figure 11:
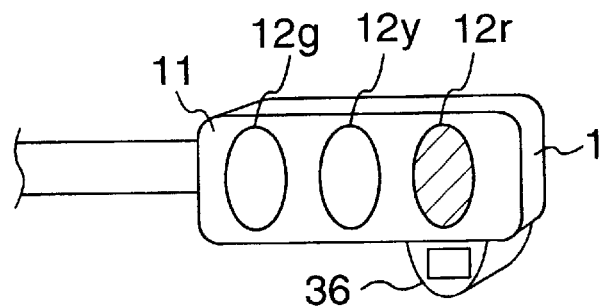
FIG. 11 is a perspective view showing another embodiment of the traffic signal light.

Turning now to FIG. 11, still another embodiment of the traffic signal light according to the present invention will be described.

In FIG. 11, a small camera housing 36 containing an internal TV camera 3 is attached to the bottom surface of a traffic light housing 11 and is connected, as in FIG. 2, to the traffic light control circuit 113 in the traffic light housing, so that the operation and effect similar to that in the embodiments of FIGS. 1 and 2 can be obtained. The present embodiment is suitable for the case where a surveillance TV camera is additionally provided to a existing traffic signal light.

Figure 12:
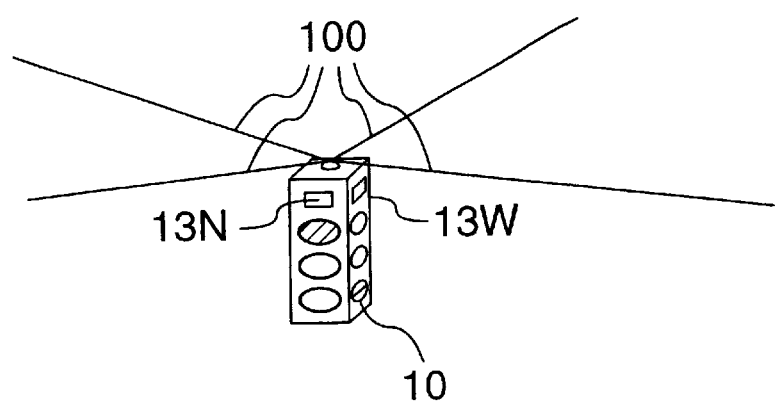
FIG. 12 is a perspective view showing still another embodiment of the traffic signal light.
Figure 15:
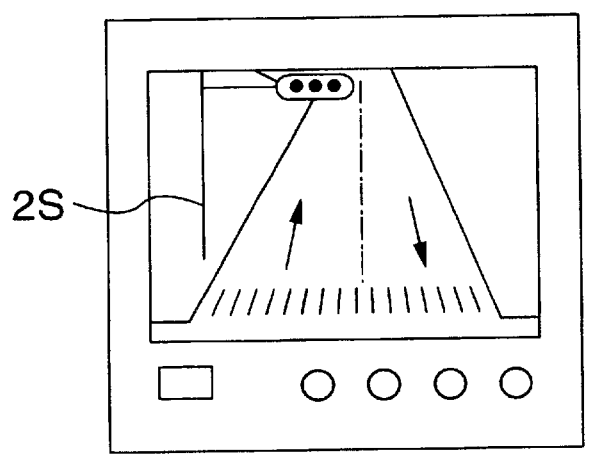
FIG. 15 is a diagram for explaining a surveillance TV monitor in the conventional system.
Figure 13:
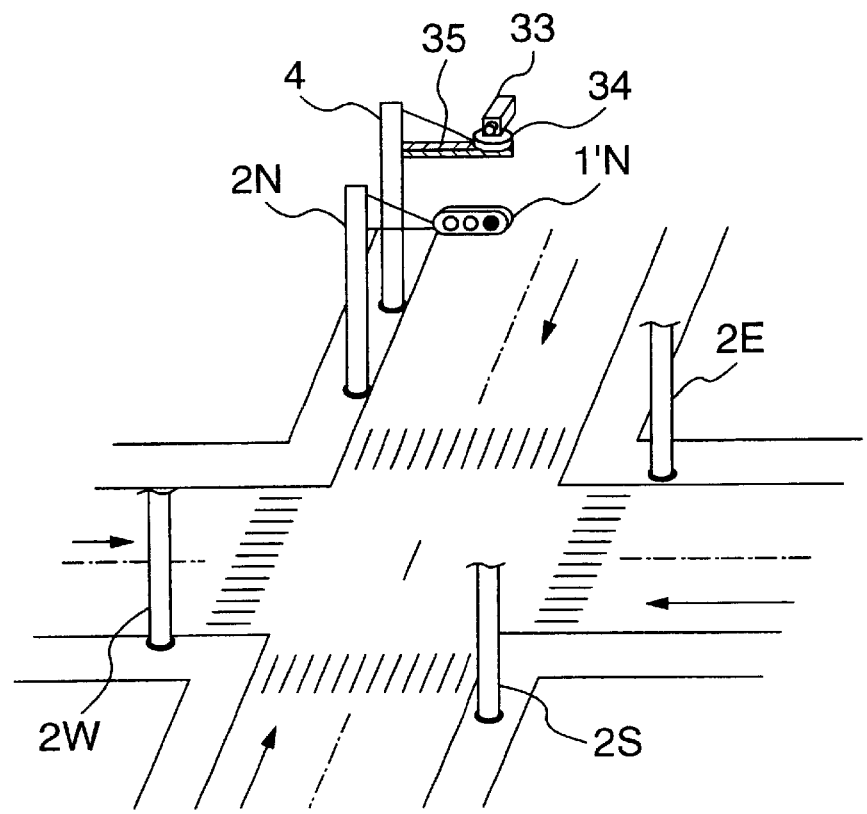
FIG. 13 is a schematic diagram for explaining an intersection and its neighboring area in a conventional system.
Figure 14:
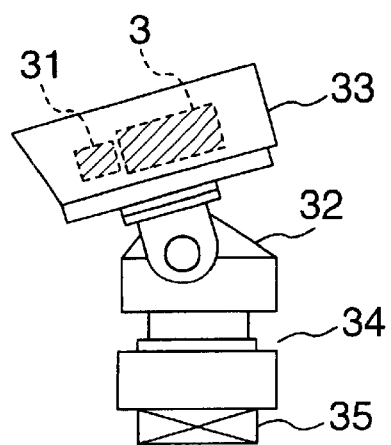
FIG. 14 is a side view of a surveillance TV camera in the conventional system.
Figure 16:
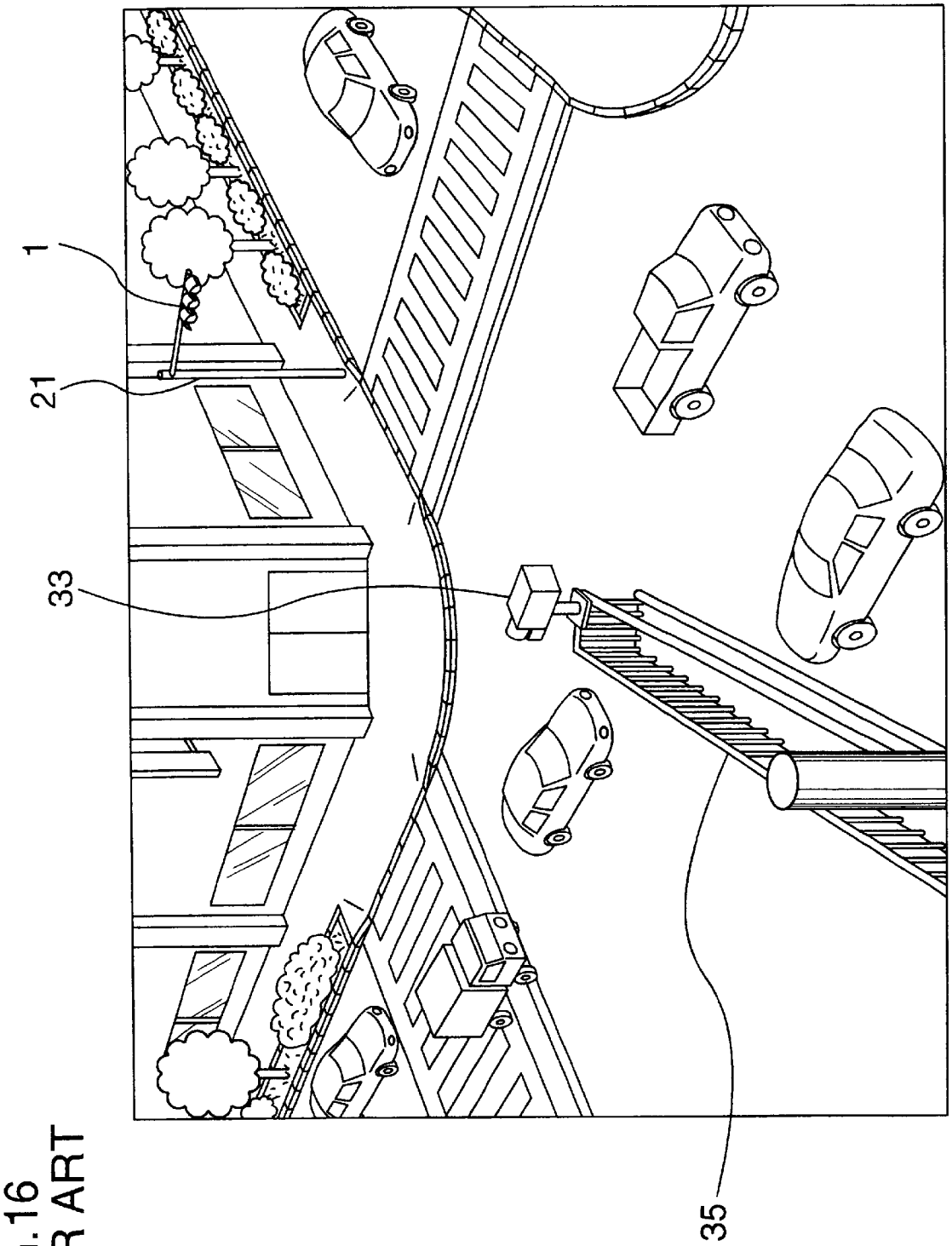
FIG. 16 is a diagram illustrative of a sketch of an intersection in the conventional system.

For convenience of explanation, the embodiments of FIGS. 2, 4 and 5 are described by way of example of the independent installation of traffic signal lights each incorporating the surveillance TV camera at east, west, south and north corners. But, obviously, the present invention can also be applied to an intersection center installed integral type traffic signal light 10 which is suspended by wires 100 as shown in FIG. 12. Alphabetical letters added W and N indicate directions (W: west, N: north) of the surveillance TV camera. The construction shown in FIG. 12 will be detailed later.

According to the embodiments of FIGS. 11 and 12, the traffic signal light post is used in common for the surveillance TV camera post so that the disturbance of passage on the sidewalk and the spoilage of the scenic beauty of city can be solved and the surveillance TV cameras can be installed at the respective corners and besides, by fetching the information of the traffic lights into an image of the surveillance TV camera, an image of high utilization value which can also be used in the advanced traffic control system can be obtained. Further, the total cost of the system can be more reduced than that of the system in which the traffic signal light and the surveillance TV camera are installed independently of each other and the installation and the maintenance/inspection work for the traffic signal light and surveillance TV camera can be carried out at a time, thus less affecting the costs and traffic regulations.

On the other hand, the TV camera is positioned near the traffic signal light or therein in FIGS. 1, 11 and 12 but the present invention is not limited thereto. For example, the post of the traffic signal light can be increased in height so that the TV camera may be installed, for example, 2 m to 3 m above the traffic signal light or a post dedicated to the camera can be set up on the top of the traffic signal light post. This instance can be applied to the case where the traffic light state is detected in accordance with the control signal for the traffic lights without resort to the direct illumination of the traffic lights. In this case, traffic conditions in a wider range can be image-picked up.

For convenience explanation, imaging an area inside an intersection emphatically has been described in connection with FIG. 3 but imaging an area outside an intersection or imaging areas inside and outside an intersection by means of two cameras also falls within the framework of the present invention. The surveillance TV camera may be directed backwardly of the intersection. In addition to the electric cable or the optical cable system, a wireless system may be employed for the traffic control network. Further, the control circuit and the like are not always required to be installed in the housing of the traffic signal light.

As will be seen from the foregoing description, image information integral with the traffic lights signal can be obtained according to the foregoing embodiments and on the basis of the thus obtained information, various kinds of high-quality traffic control systems can be realized including traffic light control, inspection of causes of the occurrence of a traffic accident, detection of a traffic signal violative vehicle, collection of fundamental materials for prevention of traffic accidents, calculation of travel time and display and broadcast service of jam information and travel time.

Figure 26:
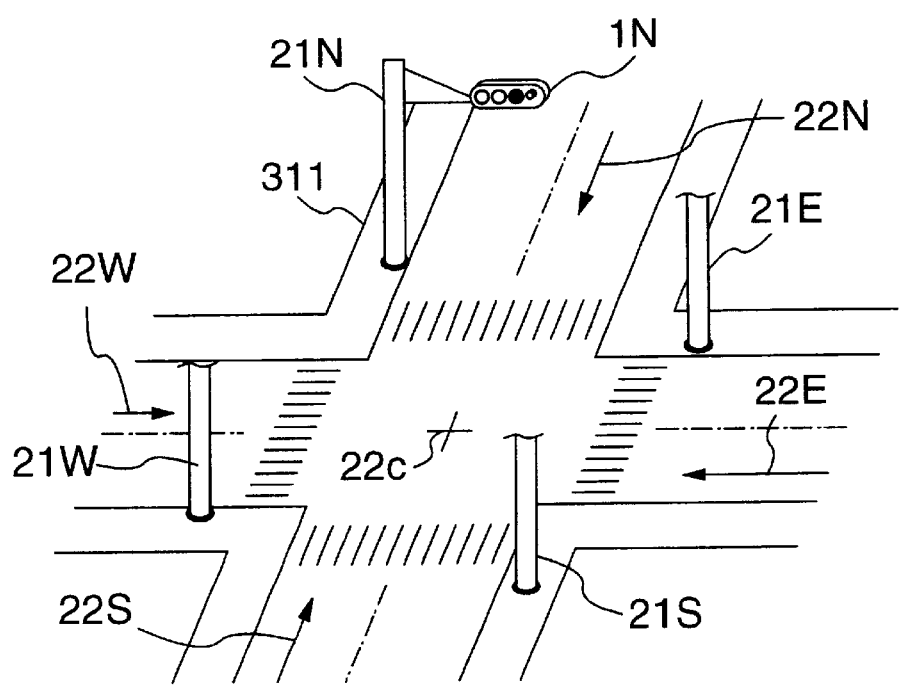
FIG. 26 is a diagram showing an example of an intersection and its neighboring area where an embodiment of a traffic signal light according to the present invention is installed.

Turning now to FIG. 26, there is illustrated an example of installation of a surveillance TV system using traffic signal lights similar to that of FIG. 1 and being directed to traffic surveillance of an intersection and its neighboring area based on TV images.

In FIG. 26, a traffic signal light proper 1N is installed at the north end of an intersection as in FIG. 1, having its post 21N. The east, west, south and north ends of the intersection where corresponding traffic signal lights and TV cameras are installed are designated by adding symbols E, W, S and N to numerals, respectively.

The traffic signal lights opposing passage directions of vehicles are installed at the east, west, south and north ends of the intersection but for convenience of illustration, only bases of posts 21E, 21W and 21S are depicted. Roads are designated by reference numeral 311. A crucial sign 22c on the road surface indicates the center of the intersection. Arrows 22N, 22E, 22W and 22S do not imply traffic regulations but indicate directions of passage of vehicles.

Further, for convenience of illustration, buildings near the intersection, passing vehicles and pedestrians are omitted.

Figure 27:
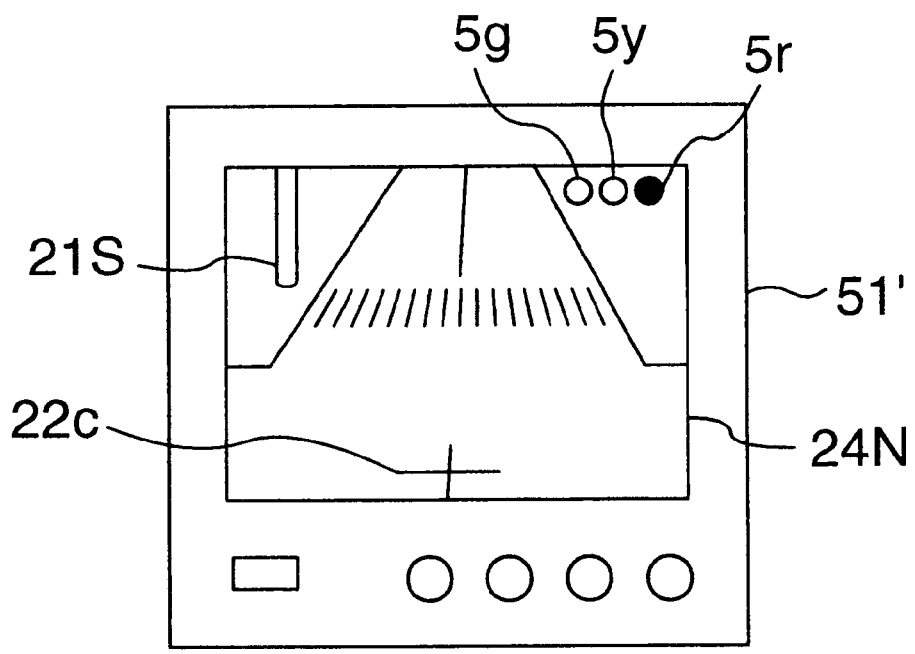
FIG. 27 is a diagram for explaining an image of a surveillance TV camera built in the FIG. 26 traffic signal light.

Referring to FIG. 27, an image of the surveillance TV camera 3 installed at the north end of the intersection is displayed on a screen 24N of a TV monitor 51' which is similar to the TV monitor 51 of FIG. 3. This side of the view field corresponds to the lower side of the screen and the opposite side of the view field corresponds to the upper side of the screen. The image on the screen is obtained by image-picking up an area inside the intersection which is south of the center 22c of the intersection and the south road as well as the base 21S of the traffic signal light installed at the south end. A state of each of the traffic lights 12g, 12y and 12r of the traffic signal light 1N (that is, 1 of FIG. 1) incorporating the TV camera 3 is indicated by 5g, 5y or 5r on the screen. A signal for this state is generated by a pattern generator (not shown) operable on the basis of lighting signals of the traffic lights and is superimposed on an image of the TV camera 1N.

Figure 24:
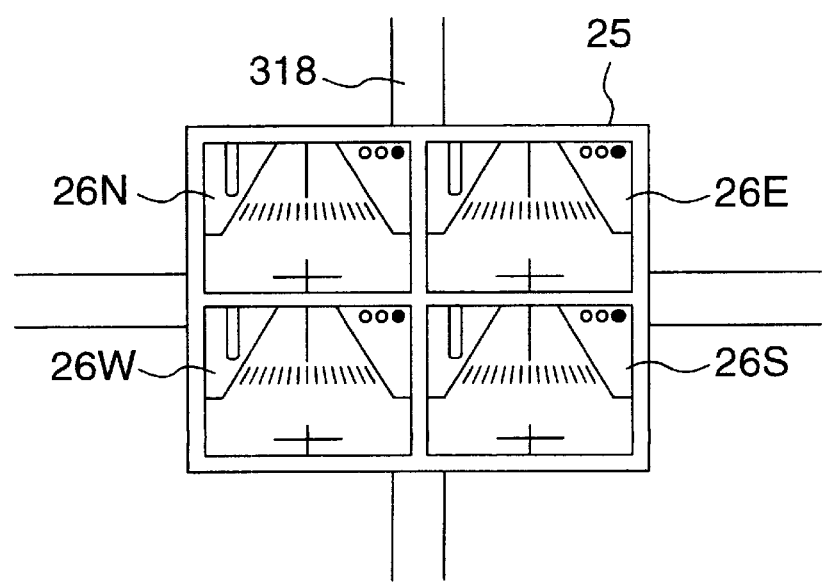
FIG. 24 is a diagram showing a conceivable example of the display board in the traffic control center.
Figure 25:
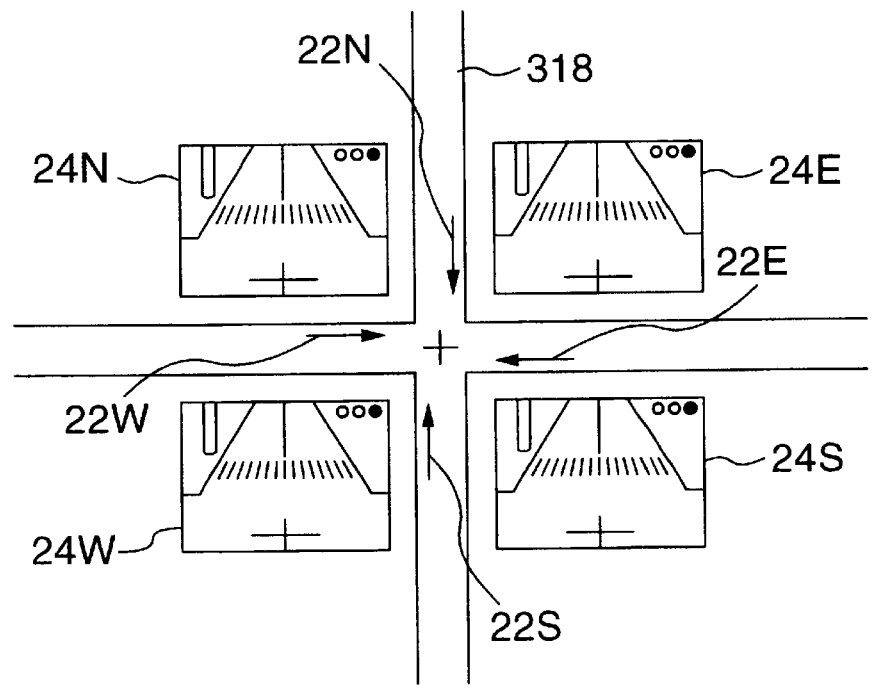
FIG. 25 is a diagram showing another conceivable example of the display board in the traffic control center.

In FIGS. 24 and 25, different examples are shown in which the monitor screen for the image from the TV camera at the north end shown in FIG. 27 and monitor screens of the surveillance TV cameras, not shown, at the east, west and south ends of the intersection are installed on a display board in the traffic control center.

In FIG. 25, an intersection portion on the map type display board arranged in the traffic control center is depicted, showing that screens 24N, 24E, 24W and 24S of the respective TV monitors are embedded at positions corresponding to installation positions of the surveillance TV cameras corresponding to the displayed images. Roads depicted on the map type display board are designated by reference numeral 318.

In the example of FIG. 24, a large-scale display 25 is divided into four parts corresponding to screens 24N, 24E, 24W and 24S of the TV monitors with the aim of saving space on the map type display board, and images 26N, 26E, 26W and 26S on the respective screens are identical to those on the screens 24N, 24E, 24W and 24S.

Predictively, with conceivable arrangements of the screens of the TV monitors shown in FIGS. 24 and 25, persons excepting experts face difficulties in intuitively grasping a state of the traffic flow passing through the intersection and suffer inconveniences in grasping traffic jam conditions and analyzing traffic accidents.

More particularly, from the standpoint of grasping traffic conditions at the intersection, the arrangements of the TV monitor screens shown in FIGS. 24 and 25 are disadvantageous in that directions of the screens displayed on the monitors are opposite to or 90° differ from directions of image-pickup by the TV cameras on the display board. Therefore, in order to concretely grasp conditions of the intersection, replacement of the directions must be taken into consideration, resulting in very troublesome work. Especially, in tracking vehicles passing through the intersection on the screen, inconsistency prevails.

Taking the display of FIG. 25, for instance, the screen 24S is an image picked up from the south and the upper part of the screen corresponds to the north direction of the road 318, so that the direction on the screen coincides with that of the map on the map type display board and there occurs no inconsistency. But the screen 24N shows an image of the south road image-picked up from the TV camera 2N at the north end and therefore, on the screen, the upper part corresponds to the south, the left side corresponds to the west and the right side corresponds to the east, so that the direction on the screen is inverse to that on the map type display board. Similarly, in the screens corresponding to the TV cameras at the east and west ends, the direction on the screen does not coincides with that on the map type display board.

Figure 17:
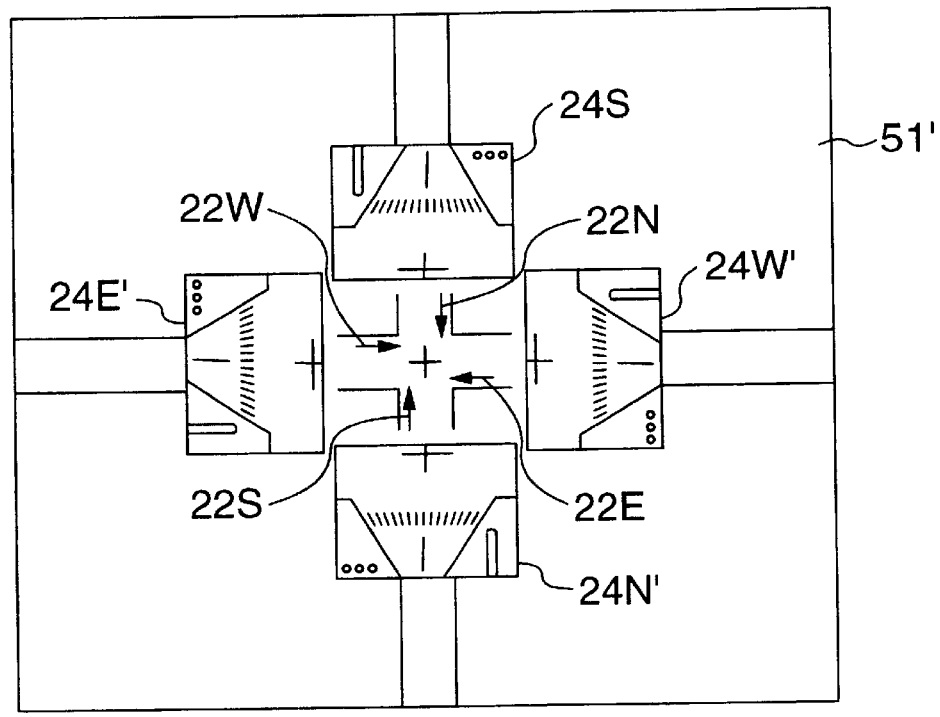
FIG. 17 is a diagram for explaining an embodiment of a display board according to the present invention.
Figure 18:
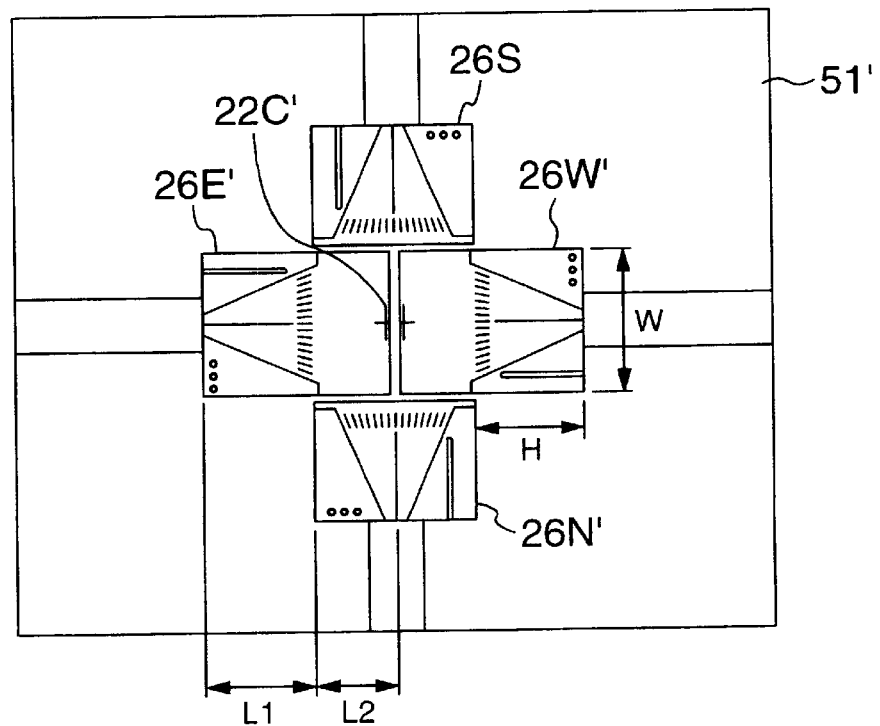
FIG. 18 is a diagram for explaining another embodiment of the display board according to the present invention.
Figure 19:
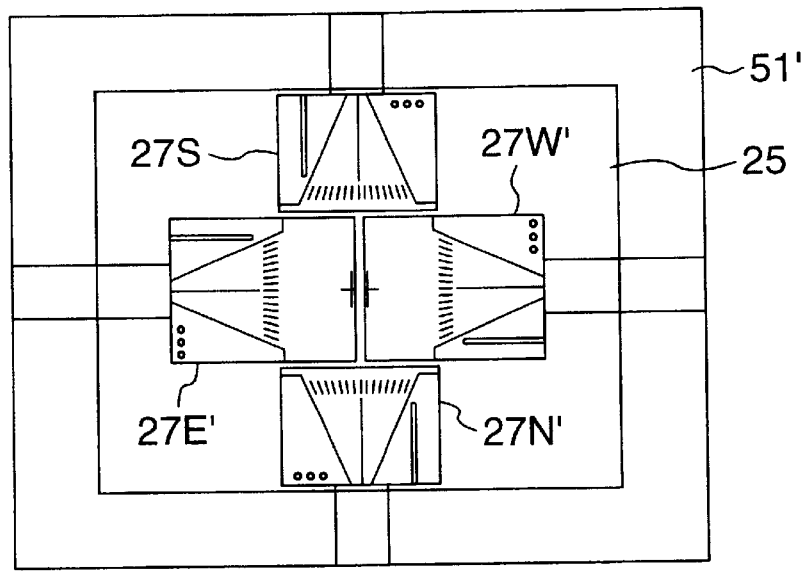
FIG. 19 is a diagram for explaining still another embodiment of the display board according to the present invention.

Embodiments of a map type information display board according to the present invention which can eliminate the aforementioned disadvantages are depicted in FIGS. 17, 18 and 19. In these figures, monitor screens are illustrated which are indicated on the map type display board adapted to display an image of the intersection and its neighboring area image-picked up at the intersection as described in connection with FIG. 26. Typically, this display board is installed in the traffic control center.

Figure 22:
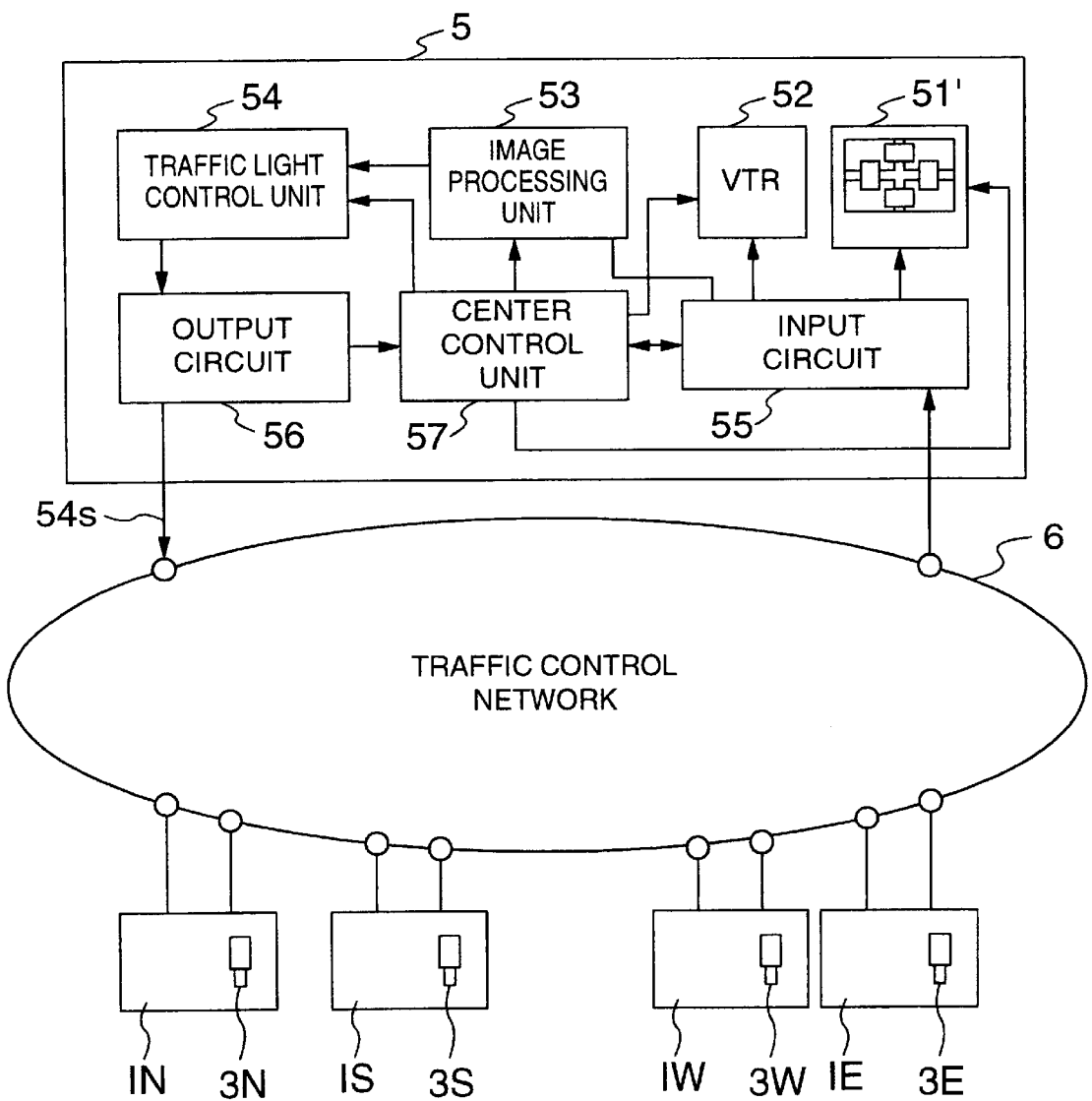
FIG. 22 is a block diagram showing an embodiment of a traffic control system according to the present invention.

Referring to FIG. 22, there is illustrated in block form an embodiment of an advanced traffic control system to which the above embodiments of the display board can be applied. Firstly, the traffic control system will be outlined briefly.

A traffic control network 6 interconnects a traffic control center 5 and individual traffic signal lights. The traffic control center 5 includes a center control unit 57 for mainly controlling the whole of the system, a traffic light control unit 54 for controlling traffic lights, an output circuit 56 for delivering a traffic light signal, an input circuit 55 for receiving a video signal from a TV camera in each traffic signal light 1, a map type information display board 51' for displaying images from the TV cameras 3, an image processing unit 53 and a VTR 52.

Video signals transmitted from the individual surveillance TV cameras 3N, 3S, 3E and 3W at the intersection are supplied to the input circuit 55 of the traffic control center 5. Each of the traffic signal lights 1N, 1S, 1E and 1W operates by receiving, through the traffic control network 6, traffic light control signals transmitted from the traffic light control unit 54 in the traffic control center 5. An image received by the image processing unit 53 is subjected to a process such as image recognition and transmitted, as information such as the length of jam, to the traffic light control unit 54. The traffic light control unit 54 determines a signal switching timing for alleviation or elimination of the traffic jam on the basis of the received information and delivers a traffic light control signal. Conditions at the intersection are displayed on the map type information display board 51' in the traffic control center 5. By comparing displays on the screens of east, west, south and north monitors disposed in correspondence to four directions of east, west, south and north, running conditions of vehicles in the individual directions can be analyzed every moment.

Next, embodiments of the display board according to the present invention will be described in greater detail by making main reference to FIG. 17.

FIG. 17 shows a fundamental embodiment of the display board according to the present invention.

In FIG. 17, (1) A monitor screen 24S on which an image of the TV camera 3S installed at the south end of the inter-section is displayed displays an image of the north side of the inter-section and therefore, the monitor screen 24S is indicated at a north side road portion of the inter-section on the map type information display board 54'.

(2) A monitor screen 24N' on which an image of the TV camera 3N installed at the north end of the inter-section is displayed displays an image of the south side of the inter-section and therefore, the monitor screen 24N' is indicated at a south side road portion of the inter-section on the map type display board 51' by 180° rotating the image on the monitor screen 24N from the upright position shown in FIG. 25.

(3) A monitor screen 24E' on which an image of the TV camera 3E installed at the east end of the inter-section is displayed displays an image of the west side of the inter-section and therefor, the monitor screen 24E' is indicated at a west side road portion of the inter-section on the map type display board 51' by 90° rotating, to the left, the image on the monitor screen 24E from the upright position shown in FIG. 25.

(4) A monitor screen 24W' on which an image of the TV camera 3W installed at the west end of the inter-section is displayed displays an image of the east side of the inter-section and therefore, the monitor screen 24W' is indicated at an east side road portion of the inter-section on the map type display board 51' by 90° rotating, to the right, the image on the monitor screen 24W from the upright position shown in FIG. 25. By arranging the images of the intersection in this manner, the occurrence of inconsistency in tracking vehicles on the screen can be prevented.

In the above embodiment, of the images shown in FIG. 25, ones of the TV cameras at the north, east and west ends are described as being rotated in the TV monitors but obviously, the image-pickup polarity of each TV camera may precedently be rotated about the center of the optical axis so that images which are originally rotated may be obtained. Further, needless to say, the arrangement of the monitors may simply be changed. These may be selected as necessary and fall within the framework of the present invention.

Referring to FIG. 18, there is illustrated another embodiment of the map type information display board according to the present invention.

In the present embodiment, TV cameras each having a screen whose aspect ratio is 4:3 and TV monitors each having a screen whose aspect ratio is also 4:3 are used and arranged as will be described below in order that roads radially extending from the center of an inter-section can be displayed as if they were viewed from above the inter-section in bird-eye's fashion. With the display as above, conditions of areas covering the inside of the inter-section and the roads can be grasped continuously to further alleviate the aforementioned inconsistency. The present embodiment will be described below in greater detail.

(1) In order that an image can be obtained on a longitudinally elongated screen as shown at a monitor TV screen 26W' in the figure, the TV camera 3E at the east end is 90° rotated about the center of the optical axis to image-pick up an area west of the center of the inter-section. At that time, image-pickup is carried out in such a manner that a west road portion (L1) occupies the elongated screen at a ratio of about 9/16 and an area (L2) inside the inter-section which is west of the center 22c of the inter-section occupies the elongated screen at a ratio of about 7/16. The image-picked up west road portion occupies about 9/16 of the screen to ensure that the ratio of the height (H) corresponding to 9/16 (that is, the road portion) to the width (W) of the screen can be determined to be 4:3. In this manner, the road portion of the monitor screen 26W' can substantially coincide in dimension with the road portion of the monitor screen 26S.

Figure 20:
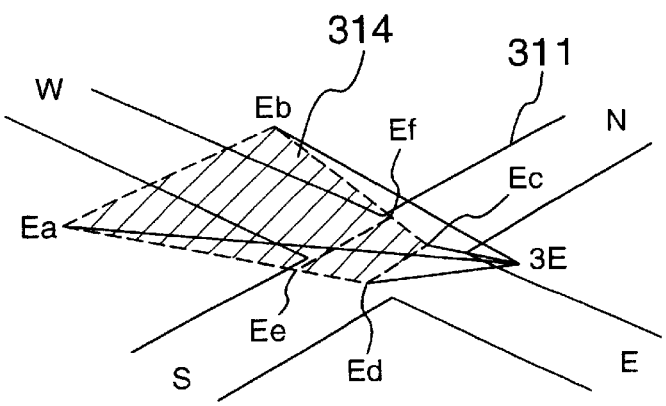
FIG. 20 is a diagram useful to explain the principle of the embodiments of FIGS. 18 and 19.

Actually, the necessary view angle is determined depending on the position of the surveillance TV camera and the road shape and a lens having a focal length which satisfies the view angle is selected. For example, when a lens having a longitudinal view angle of 43°× a width view angle of 33° for the elongated screen is mounted, about 24° of the 43° view angle corresponds to the west road portion. These conditions are schematically shown in FIG. 20. In the figure, where Ea, Eb, Ec, Ed, Ee and Ef represent line segments, Ea-Ee : Ee-Ed=Eb-Ef : Ef-Ec=9:7 stands, indicating that the TV camera 3E at the east end image-picks up the west road portion and the area inside the inter-section at the ratio 9:7. A hatched range 314 represents the image-pickup range of the TV camera 3E.

Figure 21:
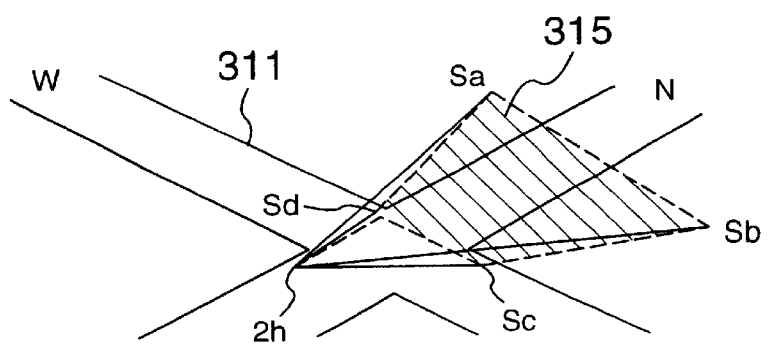
FIG. 21 is a diagram also useful to explain the principle of the embodiments of FIGS. 18 and 19.

On the other hand, when the south and north cameras have each a longitudinal view angle of about 24°× a width view angle of about 33°, the range of image-picking up the road portion by each of the south and north cameras can approximate that image-picked up by each of the east and west cameras. These conditions are schematically shown in FIG. 21. For example, the image-picking up range of the TV camera 3N at the north end is a range 315 which is viewed from a central portion of the south road and surrounded by points Sa, Sb, Sc and Sd. In other words, each of the south and north TV cameras photographs only the road which adjoins the inter-section.

(2) The TV camera 3W at the west end is constructed similarly to the TV camera 3E at the east end with the only exception that it is 90° rotated in the inverse direction.

(3) The TV camera 3S at the south end is constructed similarly to the TV camera at the north end with the only exception that the direction of image is 180° rotated about the center of the optical axis, and image-picks up a north road extending from the north end of the inter-section.

(4) In the present embodiment, all of the TV monitor screens are arranged laterally as illustrated and in order that the aspect ratio of the road portion image size displayed on each of the screens 26E' and 26W' approximates that displayed on each of the screens 26S and 26N', each of the screens 26E' and 26W' is sized to have the selected aspect ratio which is substantially 3:4 and each of the screens 26S and 26N' is also sized to have the selected aspect ratio which is substantially 3:4. In the case of image-picking up at the above-mentioned view angle, since the road portion image of each of the south and north cameras is four-thirds that of each of the east and west cameras, it is possible to approximately coincide the sizes of the road portion images with each other by making the size of the monitors for the south and north cameras four-thirds that of the east and west cameras. For example, when each of the screens 26E' and 26W' is of 22 inches, it is desirable that each of the screens 26S and 26N' being of 16 inches be employed.

In the embodiment of FIG. 18, the TV monitors of different sizes are used in combination but in another embodiment shown in FIG. 19, a single large-scale display 25 is used and images picked up by the individual TV cameras as in the embodiment of FIG. 18 are displayed in the form of divided screens on the large-scale display 25 by keeping the aforementioned aspect ratio in image size.

To differ from the arrangement in FIG. 19, the east and west cameras are 90° rotated about the center of the optical axis and consequently, the scanning direction for the east and west cameras can be the same as that for the south and north cameras, thereby facilitating image processing.

In advance to displaying the divided screens, by cutting out duplicate portions of images of the individual TV cameras to make joints of the images inconspicuous, an image of the intersection which approximates a bird-eye's view taken from above the center of the inter-section by means of an ultra-wide lens can be obtained.

Figure 23:
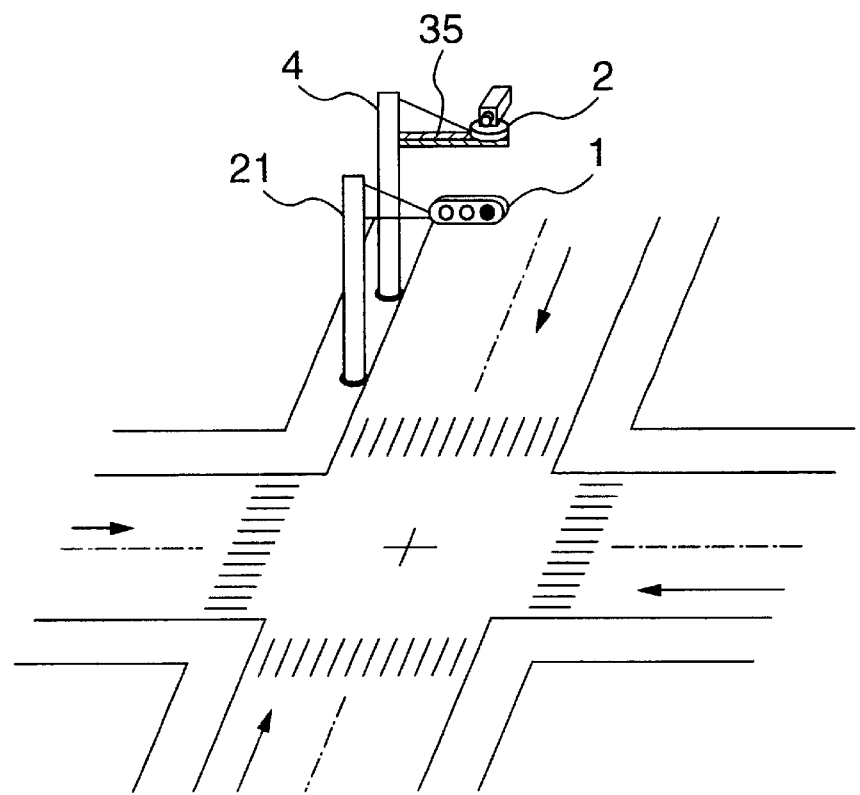
FIG. 23 is a diagram showing an embodiment of installation of a traffic signal light according to the present invention.

In the foregoing description, the TV camera has been described as being integral with the traffic signal light by being built in the housing of the traffic signal light but obviously, the TV camera 3 may be installed near the traffic signal light 1 as shown in, for example, FIG. 23.

The foregoing embodiments have been described in connection with the quadri-furcated intersection but the present invention may obviously be applicable to a trifurcated intersection and a quinary-furcated inter-section. In addition to the trifurcated intersection and quinary-furcated intersection, an intersection of an irregular structure is conceivable to which the embodiment of FIG. 17 can be applied suitably with the most ease.

As described above, in the embodiments of FIGS. 17, 18 and 19, by making the arrangement and direction of images of the individual TV monitor screens coincident with the direction on the map type information board to obtain images like bird-eye's views of the intersection and its neighboring area, even unexperienced persons are permitted to intuitively grasp a state of traffic flow and besides, a rapid and accurate decision can be made on conditions even in analysis of a traffic accident.

Next, still another embodiment of the traffic signal light according to the present invention will be described. In the present embodiment, traffic lights, an intersection surveillance TV camera and a TV camera for image-picking up a traffic signal light are contained in a traffic light console or are formed integrally with the traffic light console to ensure that a post of the traffic signal light can be used in common for a post of the surveillance TV camera, and installation of the surveillance TV camera at each corner is practiced as will be described below.

Figure 28:
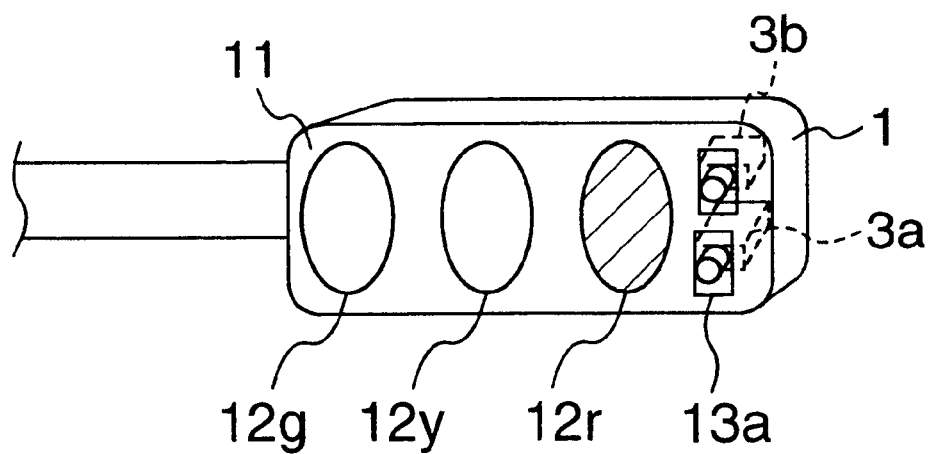
FIG. 28 is a perspective view showing still another embodiment of the traffic signal light according to the present invention.

Referring to FIG. 28, the traffic signal light of the present embodiment is illustrated in perspective view form.

In FIG. 28, there are seen a traffic signal light 1 of the present invention, and a traffic light housing 11 in which a green traffic light 12g, a yellow traffic light 12y and a red traffic light 12r are mounted, surveillance windows 13a and 13b for surveillance TV cameras 3a and 3b built in the housing, respectively. Principally, the TV camera 3a is adapted to image-pick up an area inside an inter-section and the TV camera 3b is adapted to photograph a traffic light indication of the confrontal traffic signal light.

The present embodiment presupposes that surveillance TV cameras are built in housings of individual east, west, south and north traffic signal lights so as to carry out ideal surveillance. Each of the surveillance TV cameras 3a and 3b is associated with a predetermined object and therefore, the TV camera need not be changed in view angle and direction during use and typically, dispenses with the motor-driven zoom lens and pan and tilt head. But, as necessary, the pan and tilt head may obviously be provided to change the above construction. Since the TV cameras 3a and 3b are contained in the traffic light housing 11, the dedicated housing 33 as needed conventionally can be omitted. With the traffic signal light as above, any post dedicated to the surveillance TV camera can obviously be unneeded. As a result, installation of many TV cameras in individual directions can be facilitated and the problem that buildings and the traffic flow in the opposite lane disturb desirable photographing can be prevented from being raised. Further, the dead angle including an area directly beneath a particular TV camera and an area behind that TV camera can be recognized by a different TV camera and besides, traffic conditions in all directions can be associated mutually by taking unobstructed views of all directions at a time. Furthermore, congested setting-up of TV camera posts can be excluded, with the result that not only the sidewalk area can be widened and the dead angle as viewed from vehicles can be reduced but also good results can be obtained from the standpoint of the scenic beauty. In addition, by using the TV camera 3b exclusively for image-pickingup of the traffic signal light, image-pick up can be carried out at a view angle which takes a swing due to a strong wind into account and an image of traffic lights which is separated through pattern recognition techniques can be utilized, so that deviation of the image of the traffic signal light from the screen under the influence of winds can be avoided substantially.

Figure 29:
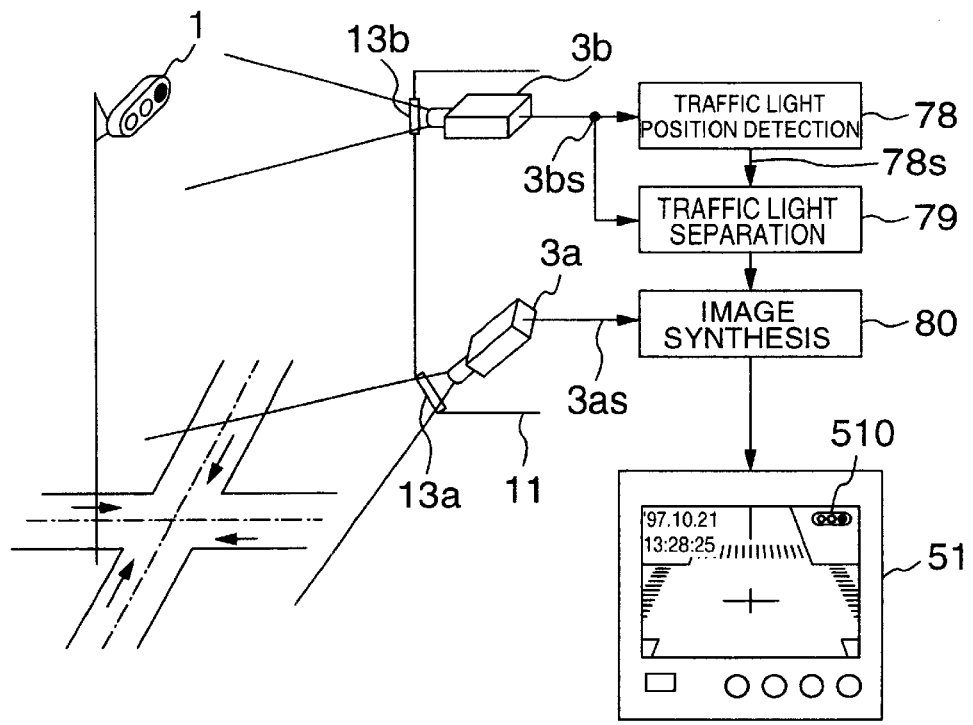
FIG. 29 is a block diagram showing still another embodiment of the traffic surveillance system.

Referring to FIG. 29, there is illustrated in block form a still another embodiment of the traffic surveillance system according to the present invention. In the present embodiment, the traffic signal light as shown in FIG. 28 having the traffic lights housing 11 in which the TV cameras 3a and 3b are contained is used as a traffic signal light. Typically, four traffic signal lights are installed at an intersection but for simplicity of explanation, only one of them is illustrated.

As shown, the system comprises a traffic light position detecting circuit 78, a circuit 79 for separating a traffic light portion and an image synthesizing circuit 80. For convenience of explanation, these circuits are described as being hardware for exclusive use but alternatively, their function may be fulfilled by software of a computer.

Next, the operation of the system will be described. In FIG. 29, from a video signal 3bs transmitted from the TV camera 3b image-picking up the confrontal traffic signal light 1, a traffic light position on the screen is detected by the traffic light position detecting circuit 78 and on the basis of detection information 78s, only an image of the traffic lights is separated by means of the traffic light separation circuit 79. The separated image 510 is superimposed on or synthesized (combined) with an image 3as transmitted from the inter-section inside area photographing TV camera 3a by means of the image synthesizing circuit 80 so as to be displayed at a position on monitor 51 which does not disturb the display of a traffic flow image as shown in the figure.

This image can be transmitted, as necessary, to a video recording unit, not shown, such as a VTR or a video disc recorder and a traffic control center not shown either.

Figure 30:
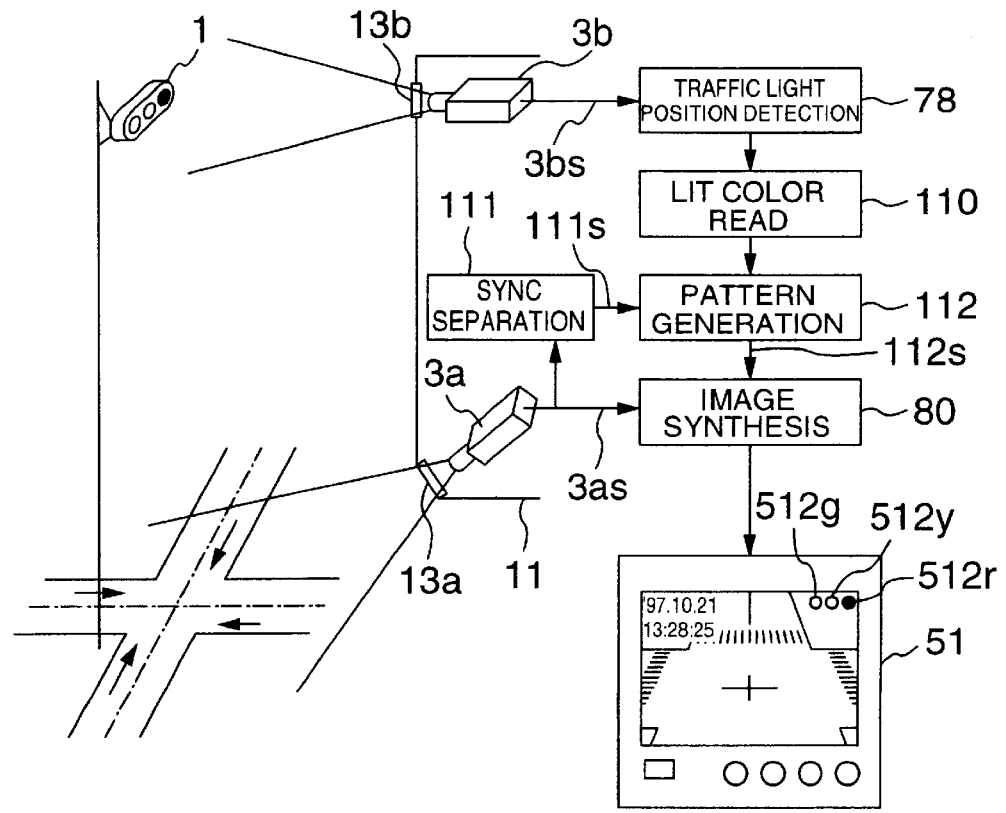
FIG. 30 is a block diagram showing still another embodiment of the traffic surveillance system.

Detection of the traffic lights position by means of the traffic lights detecting circuit 78 can be realized easily through a well-known technique such as pattern matching method. Referring to FIG. 30, there is illustrated still another embodiment of the traffic surveillance system according to the present invention.

In FIG. 30, a lit color read-out circuit 110 reads a lit color of traffic lights detected by a traffic light position detecting circuit 78 and a detected lit color signal is supplied to a the traffic light pattern generation circuit 112. Then, the generation circuit 112 responds to a synchronizing signal 111s delivered out of a synchronous separation circuit 111 to deliver a pattern signal 112s synchronous with a video signal 3as and the video signal 3as and the traffic light pattern signal 112 are synthesized with each other by means of an image synthesizing circuit 80, so that a state of the traffic lights is patterned and displayed on a monitor 51 as shown in the figure, along with an image indicative of an intersection inside area. More particularly, relative positions of the individual traffic lights are indicated by small circles and only a circle corresponding to a lit light is colored by a lighting color of that traffic light, so that as shown in the figure, a pattern 512r corresponding to a lit red traffic light 12r is displayed in red but patterns 512g and 512y corresponding to unlit traffic lights 12g and 12y are displayed in the form of mere blank circles indicative of position. The display positions of the traffic light patterns 512r, 512g and 512y can be moved to desired positions which do not disturb the image of traffic flow.

By comparing the traffic signal light 1 with displays of monitors installed in the four directions of east, west, south and north, running conditions of vehicles in the individual directions can be analyzed every moment in association with switching of the traffic lights.

Figure 31:
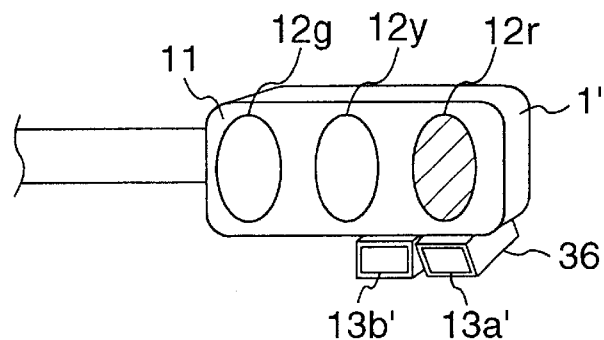
FIG. 31 is a perspective view showing still another embodiment of the traffic signal light according to the present invention.

Referring to FIG. 31, still another embodiment of the traffic signal light according to the present invention is illustrated in perspective view form.

In FIG. 31, a housing 36 incorporating compact TV cameras has surveillance windows 13a' and 13b' and it is mounted to the bottom surface of a traffic light housing 11 to attain the operation and effect similar to that in the embodiments of FIGS. 29 and 30. The present embodiment is suitable for the case where the surveillance TV cameras are additionally provided to the existing traffic signal light.

For convenience of explanation, the embodiments of FIGS. 29, 30 and 31 have been described by referring to the example where the traffic signal lights each incorporating the surveillance TV camera are installed independently at the east, west, south and north corners but obviously, the present invention can also be applied to an intersection center installed integral type traffic signal light which is suspended by wires.

According to the present embodiment, by using the traffic signal light post in common for the surveillance TV camera post, such disadvantages that passage on the sidewalk is disturbed and the scenic beauty of city is spoilt can be eliminated and the surveillance TV cameras can be installed at the individual corners and besides, by constantly fetching information of the traffic lights into an image of the surveillance TV camera, an image of high utilization value can be obtained which can also be utilized in the advanced traffic control system.

The total cost of the system can be reduced as compared to that of the system in which the traffic signal light is installed independently of the surveillance TV camera and the installation and maintenance/inspection work for the traffic signal light can be carried out concurrently with that for the surveillance TV camera, thus less affecting the costs and the traffic regulations.

For convenience of explanation, the embodiments of FIGS. 29 and 30 have been described by referring to the example where an area inside the intersection is mainly watched but an area outside the intersection may be watched or a plurality of cameras may additionally be provided to the traffic signal light to watch areas inside and outside the intersection. Further, the direction of the surveillance camera may be inverse to the intersection.

Conceivably, a method may be employed in which a TV camera for photographing traffic lights of a confrontal traffic signal light and another TV camera for image-picking up an area inside an intersection are mounted to different posts and images of the two TV cameras are displayed on divided screens. But this method is disadvantageous in that the two TV cameras are swung differently when there is a high wind, thereby producing images which are difficult to see. In the present invention, the two TV cameras are built in or integral with the housing of the traffic signal light and the disadvantages as above hardly occurs.

According to the present embodiment, thanks to the provision of the plurality of TV cameras, an image of the confrontal traffic signal light and conditions inside the intersection can be grasped concurrently and accurately and in addition, the TV cameras are mounted inside the traffic signal light or directly mounted to the traffic signal light, thereby ensuring that the special, dedicated post need not be installed.

Further, since the position to be image-picked up by each TV camera is predetermined, the pan and tilt head and the zoom mechanism are not required, leading to reduction in weight. Obviously, the pan and tilt head and the zoom mechanism may be used as necessary.

Furthermore, according to the present embodiment, the surveillance TV camera is installed in only the traffic signal light at each corner, thereby making it easy to simultaneously grasp conditions of traffic flow in all directions at the intersection and its neighboring area from optimal positions. Accordingly, the image of the surveillance TV camera can be used, for multipurpose, as a part of the advanced traffic control system. In addition, the disturbance of passage of pedestrians and the spoilage of the scenic beauty of cities can be prevented.

In any of the foregoing embodiments, the traffic signal light provided with the TV camera needs to be installed at each corner of an intersection in order to permit surveillance in all directions. Embodiments will be described hereinafter in which bird-eye's views in all directions at a traffic strategic point such as an intersection can be taken at a time by using a single TV camera.

Figure 32:
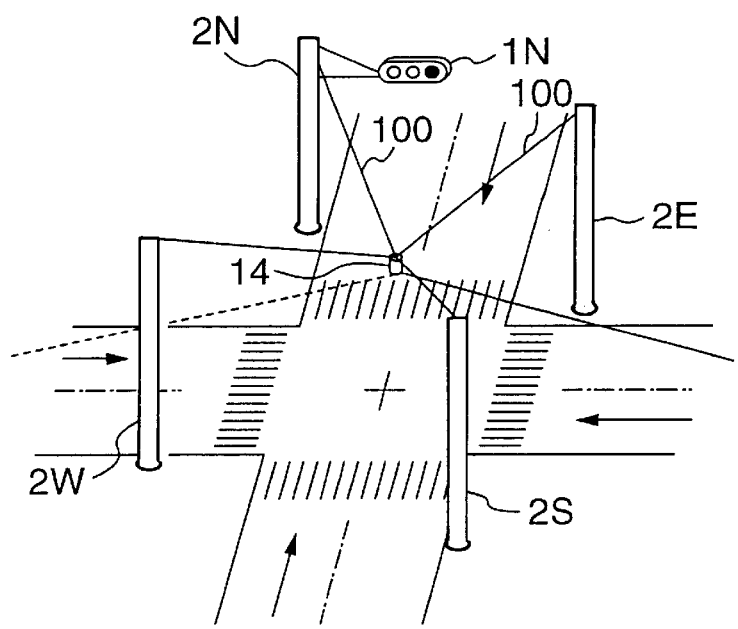
FIG. 32 is a diagram for explaining still another embodiment of the traffic surveillance system according to the present invention.

Referring to FIG. 32, there is illustrated an example of installation, at an intersection and its neighborhood, of a surveillance TV system which intends to surveille traffic at the intersection and its neighborhood by using TV images. A TV camera 3 and its neighborhood are illustrated exaggeratedly in FIG. 33.

Figure 33:
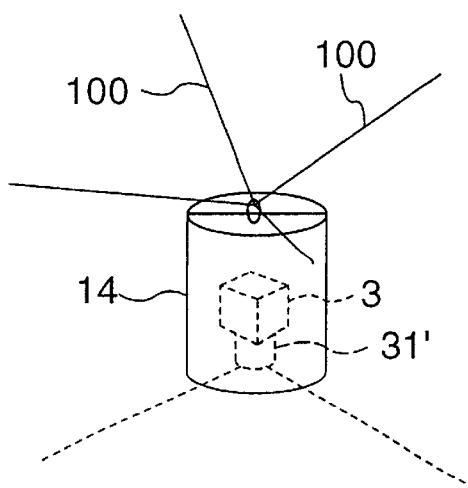
FIG. 33 is perspective view showing details of the essential part of the FIG. 32 embodiment.

In FIGS. 32 and 33, the surveillance TV camera 3 is built in a surveillance camera housing 14 which suspends substantially in the center of an intersecting from wires 100 stretched across tops of substantially diagonally opposing posts of traffic signal lights 2N and 2S and substantially diagonally opposing posts of traffic signal lights 2W and 2E. The surveillance TV camera 3 is combined with an ultra-wide angle lens 31' to simultaneously take bird-eye's views of the intersection and its neighborhood in all directions. With this construction, congested setting-up of TV camera posts can be excluded to widen the sidewalk area, leading to reduction of the dead angle as viewed from vehicles, and the scenic beauty of city can be ensured to advantage.

Figure 34:
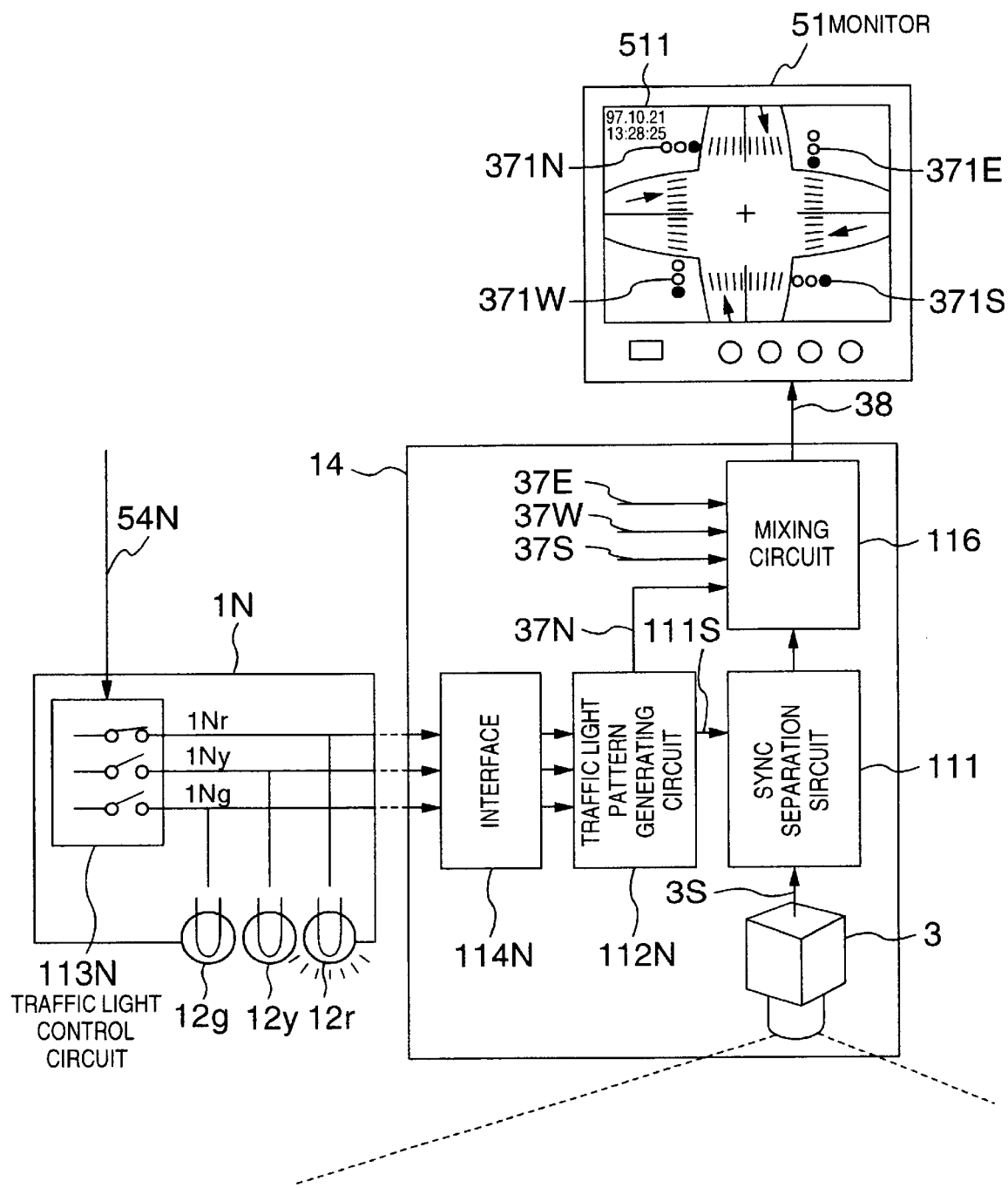
FIG. 34 is a block diagram showing still another embodiment of the traffic surveillance system according to the present invention.

Referring to FIG. 34, there is illustrated in block form still another embodiment of the traffic surveillance system according to the present invention. In the figure, an image synchronous composite signal 3S delivered out of a TV monitor 3 suspended substantially in the center of an intersection is supplied to a monitor 51 through a sync separation circuit 111 and a mixing circuit 116 so as to be displayed as shown.

On the other hand, the contents of lighting of a traffic signal light 1N at the north end of an intersection is controlled by a control signal 54N from a traffic control center (not shown) and a traffic light control circuit 113N is so controlled as to deliver traffic light lighting signals 1Nr, 1Ny and 1Ng to a red traffic light 12r, a yellow traffic light 12y and a green traffic light 12g. In the figure, a state in which the red traffic light 12r is lit is depicted.

The traffic light lighting signals 1Nr, 1Ny and 1Ng are branched so as to be supplied to a traffic light pattern generating circuit 112N through an interface circuit 114N.

The traffic light pattern generating circuit 112N is applied with a synchronizing signal 111S produced from the sync separation circuit 111 and the traffic light lighting signals 1Nr, 1Ny and 1Ng converted by the interface 114N to generate a traffic light pattern signal 37N synchronous with the image synchronous composite signal 3S of the TV camera 3. The signal 37N is supplied to the mixing circuit 116.

In addition to the traffic light pattern 37N corresponding to the traffic signal light 1N at the north end of the intersection, traffic light patterns 37E, 37W and 37S corresponding to traffic signal lights at the east, west and south ends are also supplied to the mixing circuit 116 so as to be mixed with intersection birdeye's view images of the TV cameras 3 and consequently, traffic light patterns 371N, 371E, 371W and 371S are displayed as shown at positions corresponding to positions of the traffic signal lights or of the traffic lights at the intersection.

More particularly, in the traffic light patterns 371N, 371E, 371W and 371S, relative positions of the individual traffic lights are indicated by small circles and only a circle corresponding to a lit traffic light is colored by a lighting color (red) of that traffic light while circles corresponding to unlit traffic lights being indicated in the form of mere blank circles indicative of position. The display positions of the traffic light patterns 371N, 371E, 371W and 371S can be moved to desired positions which do not disturb the traffic flow image.

For convenience of explanation, in the present embodiment, the pattern signals 37N, 37E, 37W and 37S have been described as being mixed with the image signals but they may be separated signals which may be displayed in small windows on the screen.

As necessary, an output signal 38 of the mixing circuit 116 may also be supplied to a recording unit such as a VTR (not shown) and a traffic control center (not shown).

By utilizing the traffic strategic point surveillance TV system as above, running conditions of vehicles in all directions can be analyzed every moment in association with switching of the traffic lights.

In the present embodiment, for convenience of explanation, the circuit concerning the image synthesis has been described as being built in the TV housing 14 but it may be separated from the TV camera so as to be housed in a separate console and mounted to a traffic signal light post in order that the mass of the suspending portion can be reduced and the maintenance work can be facilitated to advantage. If the traffic signal light post has an arcuate frame structure which spreads across an intersection, a high camera position can be ensured and the strength of the post can be promoted. By installing a TV camera near a rooftop of a building adjacent to an intersection, the range of image-picking up can be extended up to roads around the intersection.

Figure 35:
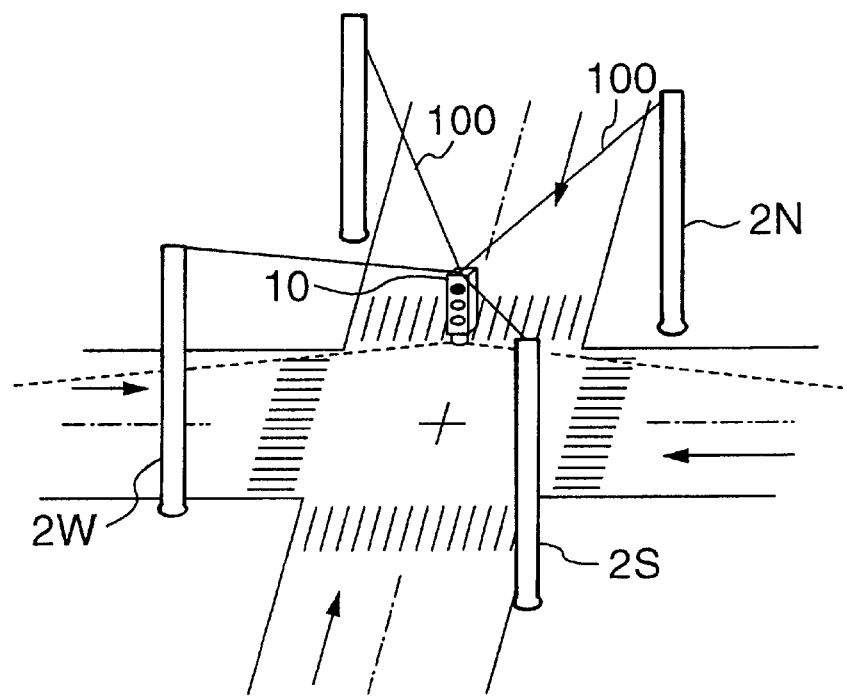
FIG. 35 is a diagram for explaining still another embodiment of the traffic surveillance system according to the present invention.
Figure 36:
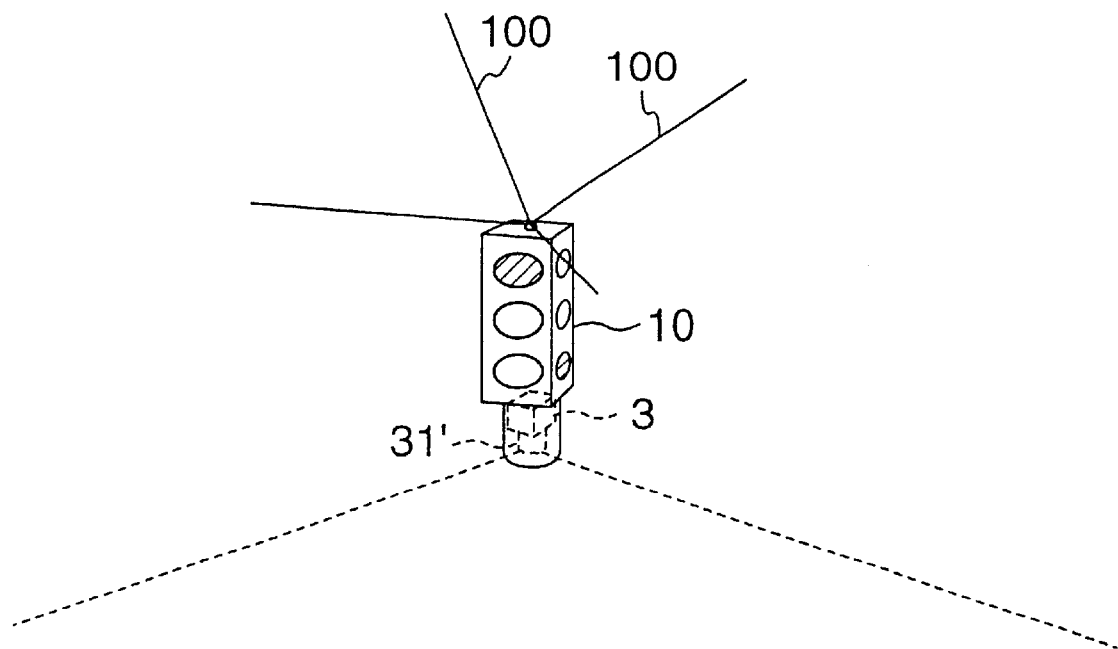
FIG. 36 is a perspective view showing a traffic signal light in the FIG. 35 embodiment.

Referring to FIG. 35, there is illustrated still another embodiment of the traffic surveillance system according to the present invention. A traffic signal light in the present embodiment is detailed in perspective view form in FIG. 36.

In the present embodiment, an intersection center installed integral type traffic signal light 10 is suspended from wires 100 which spread across substantially diagonally opposing posts 2E and 2W and substantially diagonally opposing posts 2S and 2N and has a bottom portion in which a TV camera 3 is built face down. The TV camera 3 is combined with an ultra-wide angle lens 31' to simultaneously take bird-eye's views in all directions of the intersection and its neighboring area. The components inclusive of traffic lights as shown in FIG. 5 are also built in the traffic signal light 10 to attain the operation and effect similar to that in the embodiment of FIG. 35.

Figure 37:
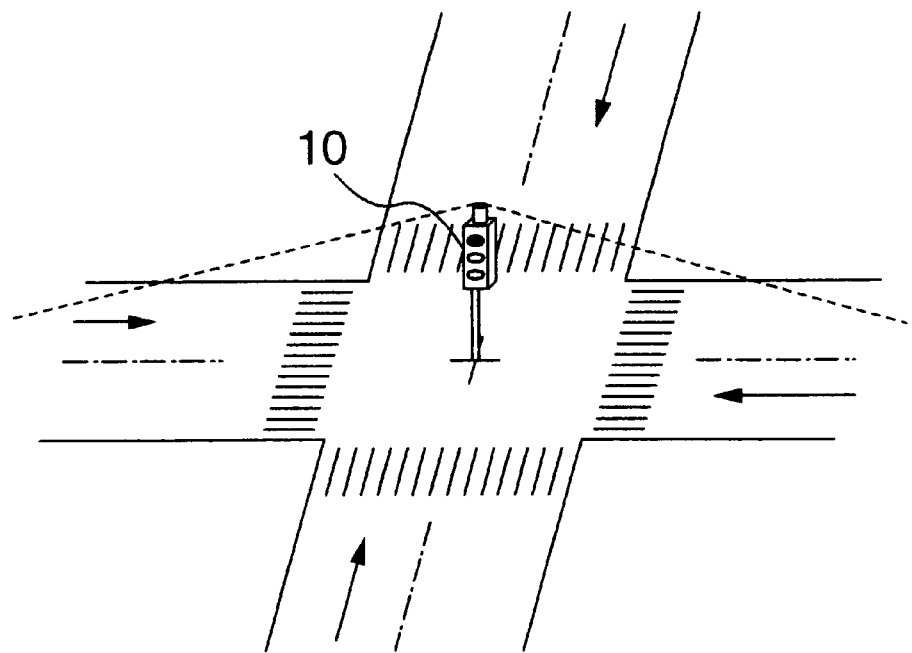
FIG. 37 is a diagram for explaining still another embodiment of the traffic surveillance system according to the present invention.
Figure 38:
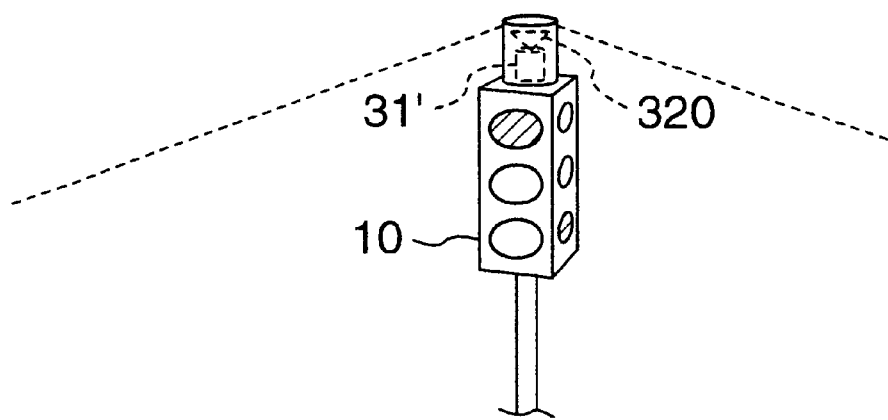
FIG. 38 is a perspective view showing details of a traffic signal light in the FIG. 37 embodiment.

Referring to FIG. 37, there is illustrated still another embodiment of the traffic signal light according to the present invention in which a TV camera (not shown) is built with face up in a top portion of a housing of an intersection center installed self-standing integral type traffic signal light 10. Details of the traffic signal light are shown in FIG. 38. In these figures, a conical mirror 320 whose apex is face down is disposed on the optical axis of a lens of the TV camera so that the TV camera 31' may take bird-eye' views of an intersection and its neighborhood in all directions which are reflected by the conical mirror 320. Further, components inclusive of traffic lights shown in FIG. 35 are also built in the traffic signal light 10 to attain the operation and effect similar to that in the embodiment of FIG. 35.

According to the embodiment described as above, the disturbance of passage of pedestrians and the spoilage of the scenic beauty of city can be eliminated and by fetching information of traffic lights into an image of the surveillance TV camera, an image of high utilization value can be obtained which can also be utilized in the high-quality traffic control system.

Figure 39:
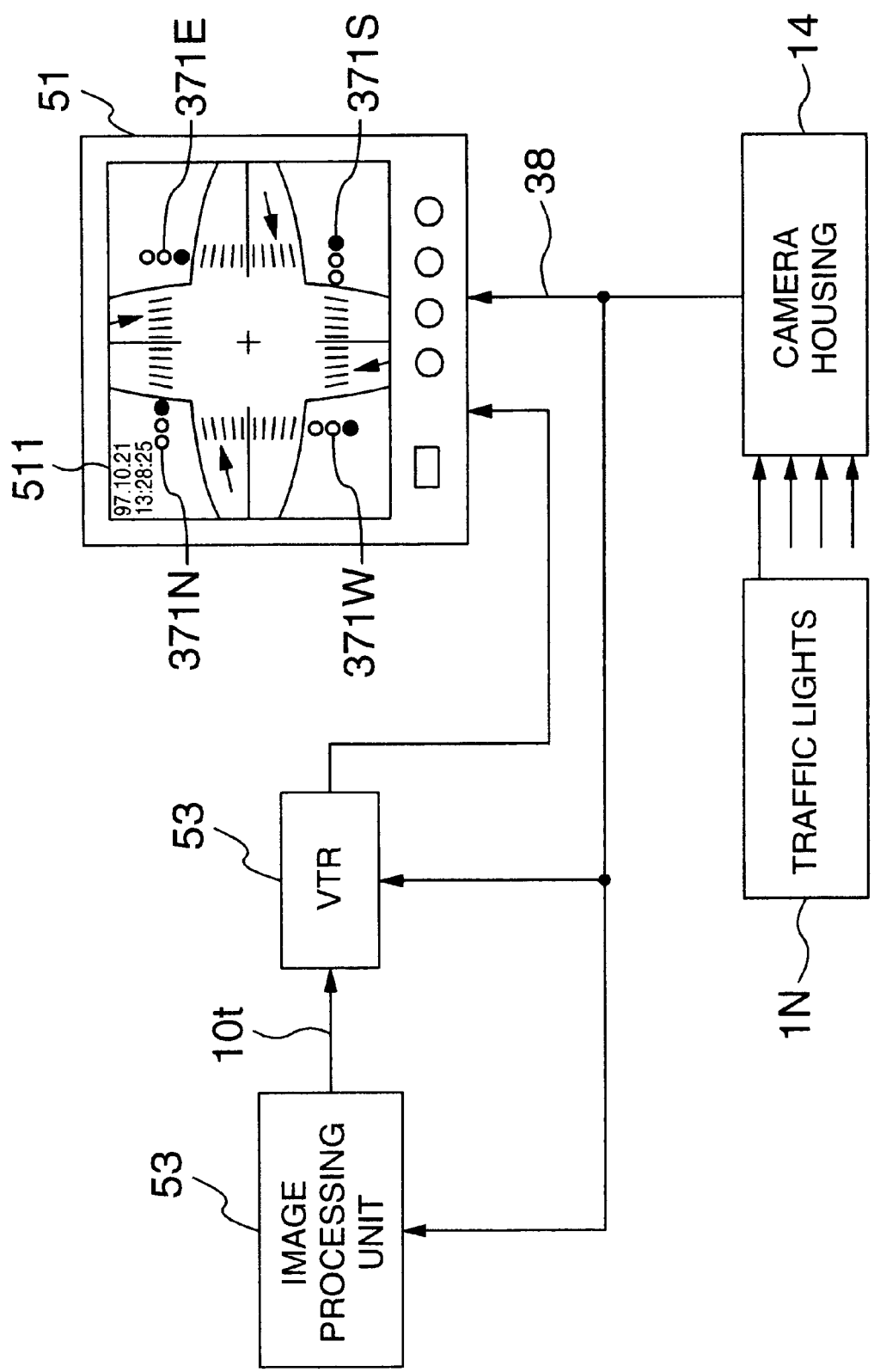
FIG. 39 is a block diagram showing still another embodiment of the traffic surveillance system according to the present invention.

Referring to FIG. 39, still another embodiment of the traffic surveillance system according to the present invention will be described. The present embodiment is applicable to all the embodiment set forth so far and is directed to an instance where an image is monitored and at the same time recorded on a VTR on the surveillance side. In the present embodiment, conditions at an intersection can always be recorded on the VTR 52 and can be used for, for example, analysis of an accident. Further, in the present embodiment, through pattern recognition by means of an image processing unit 53, the occurrence of abnormal conditions, for example, accidents is detected through the pattern recognition to produce a trigger signal 10t. The trigger signal 10t is superimposed on an image so as to be recorded on a video tape. This record portion can be detected easily later for the purpose of analyzing causes of an accident. As has already been described in connection with FIGS. 9 and 10, the accident detection trigger signal 10t is transmitted, as a so-called well-known "index signal", to a VISS circuit (or the digital index and skip search function) of the VTR 52 and then recorded, as a VISS signal, on the video tape. In this case, since the VTR 52 continuously records a video signal, the video signal need not be delayed and is recorded on the video tape concurrently with the VISS signal.

The construction for use of the VISS signal and effects obtained thereby have already been described in connection with FIGS. 9 and 10 and will not be described herein.

According to the present embodiment, as in the embodiment of FIG. 9, when confirming conditions of an accident on the screen of the video monitor while reproducing the recorded tape, the confirmation can be carried out by repetitively operating the VTR for reproduction through the aforementioned VISS function. Further, by using the slow reproduction and still function in combination for only the image indicative of th e accident conditions which is displayed in the "reproduction" mode, the accident conditions can be inspected precisely. In addition, since for an unwanted portion, the tape is fed automatically in the "forward wind" or "rewind" mode, the confirmation work can be completed within a very short time. In the present embodiment, the recording unit is exemplified by the VTR but this is not limitative and obviously, any unit capable of recording images can be employed. In this manner, continuous recording on the VTR 52 can be ensured and alternatively, as will be described below, recording can be carried out only when abnormality such as an accident is detected.

Figure 40:
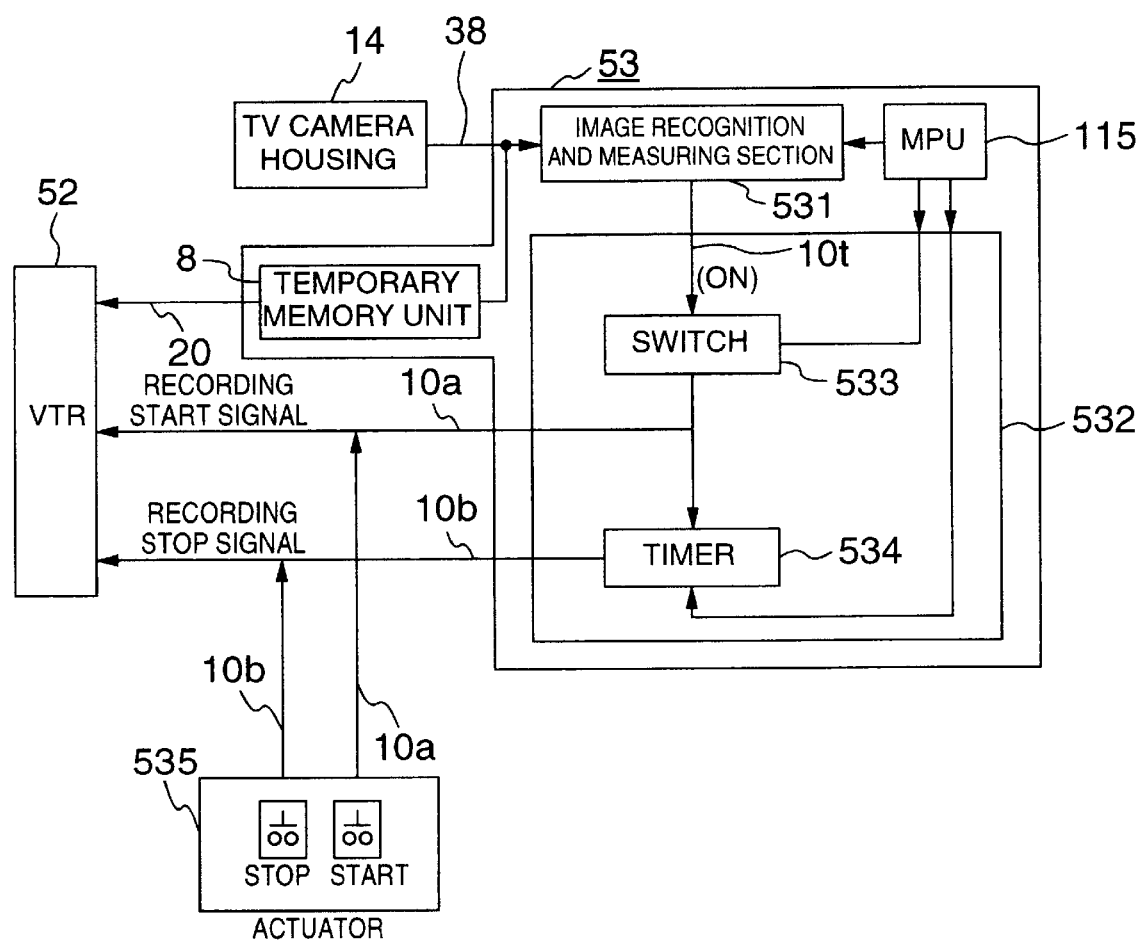
FIG. 40 is a block diagram showing details of the FIG. 39 embodiment.

The embodiment of FIG. 39 is more detailed in block form in FIG. 40.

The timing for operation of the VTR 52 in relation to real time T has already been described with reference to FIG. 10 and will not be described herein.

Referring to FIGS. 40 and 10, an image recognizing and measuring section 531 of an image recognition unit 53 automatically recognizes abnormality (accident) from a mixing signal 38 delivered out of a TV camera housing 14 and sends a detection signal 10t to a VTR control section 532. The detection signal is sent, as a recording start signal 10a, to the VTR 52 through a switch block 533. A temporary memory unit 8 supplies a T1 time, for example, 10 seconds delayed video signal to the VTR 52. The value of 10 seconds is determined on the assumption that 8 seconds preceding an accident is set and the VTR 52 has response time T3 which is, for example, 2 seconds and this value can be changed as necessary.

The VTR 52 responds to the recording start signal to start recording and after T2 seconds following the recording start (for example, in the example of FIG. 10, 60 seconds inclusive of the response time T3), responds to a recording stop signal 10b delivered out of the image recognition unit 53 to return to the stop state. The T2 seconds are measured by a timer block 534 but if abnormality is again detected during the measurement (that is, within T2 seconds), the timer block 534 is reset to restart recording. After that, the VTR operates similarly. The operation of the embodiment of FIG. 41 will be understood easily from the foregoing description given in connection with FIGS. 9 and 10 and will not be described herein.

Since, in the embodiment described as above, conditions are recorded on the video tape only when abnormality occurs and a wasteful use of the tape can therefore be prevented. In addition, during reproduction retrieval, the reproduction time can be reduced.

As described above, according to the present embodiment, image information integral with traffic lights in a plurality of directions can be obtained and on the basis of the image information, various kinds of advanced traffic control systems can be realized, including the traffic light control, the survey of causes of the occurrence of a traffic accident, the detection of a traffic violative vehicle, the collection of fundamental materials for prevention of traffic accidents, the display or broadcasting service of traffic jam information. Further, by making records on, for example, the VTR, the efficiency of analysis of the image information can be improved remarkably.

What is claimed is:

1. A traffic surveillance system for surveying conditions of traffic at an intersection, comprising:
   at least one set of traffic signal light apparatus positioned at said intersection,
   wherein said traffic signal light apparatus comprises:
      one set of traffic signal lights, each light being a different color, and
      a first controller for controlling said one set of traffic signal lights;
      a housing in which said one traffic signal lights are installed;
      a television camera installed in said housing and set so as to pick up a video image of said intersection;
      a monitor, coupled to said television camera, for displaying said video image of said intersection; and
      a second controller, coupled to said first controller, said television camera and said monitor, for controlling said first controller, said television camera and said monitor so that said video image of said intersection from said television camera and lighting information of each light of said one set of traffic signal lights from said first controller are superimposed and displayed on said monitor.

2. A traffic surveillance system according to claim 1, wherein said second controller includes a traffic light pattern generating circuit for generating said lighting information relating to said one set of traffic signal lights and a mixing circuit for mixing said video image of said television camera and an output from said traffic light pattern generating circuit.

3. A traffic surveillance system according to claim 1, wherein said video image of said intersection from said television camera is displayed in a center of the screen of said monitor and lighting information in accordance with said one set of traffic signal lights from said first controller is displayed near a side of said screen.

4. A traffic surveillance system according to claim 1, further comprising:
   a video recording unit for recording said video image of said intersection from said television camera and lighting information in accordance with said one set of traffic signal lights from said first controller.

5. A traffic surveillance system according to claim 1, further comprising:
   a sensor for detecting abnormality inside said intersection,
   wherein said second controller controls said video recording unit based on an output of said sensor in response to an occurrence of said abnormality inside said intersection.

6. A traffic surveillance system according to claim 2, further comprising:
   a temporary memory unit, coupled with said video recording unit, for temporarily recording said video image from said television camera and lighting information from said first controller.

7. A traffic surveillance system according to claim 3, wherein the output of said sensor is superimposed on said video signal and recorded on said video recording unit.

8. A traffic surveillance for surveying conditions of traffic at an intersection, comprising:
   at least one set of traffic signal light apparatus positioned at said intersection,
   wherein said traffic signal apparatus comprises:
       one set of traffic signal lights each light being a different color, and
       a first controller for controlling said one set of traffic signal lights;
       a housing in which said one set of traffic signal lights are installed;
   a plurality of television cameras installed at predetermined positions of said intersection and set so as to pick up video images of said intersection in different directions;
   a plurality of monitors, which are coupled to said television cameras, respectively, for displaying said video images of said intersection; and
   a second controller, coupled to said first controller, said television cameras and said monitors, for controlling said first controller, said television cameras and said monitors so that said video images of said intersection from said television cameras and lighting information of each light of said one set of traffic signal lights from said first controller are superimposed and displayed on said monitors.

9. A traffic surveillance system according to claim 5, wherein a plurality of said monitors are so arranged that images displayed on said monitors indicate a map of said intersection.

10. A traffic surveillance system according to claim 5, wherein a plurality of television cameras are positioned at mutually different positions of said intersection so as to pick up said video images of said intersection in different direction.

11. A traffic surveillance system according to claim 5, wherein a plurality of television cameras are positioned at a center of said intersection and said television cameras pick up said video images of said intersection in different directions.

12. A traffic surveillance system according to claim 6, wherein a plurality of said monitors are constructed by one monitor and said vide images from a plurality of said television cameras are displayed on the screen of said one monitor as the map of said intersection.

13. A traffic surveillance system according to claim 1, wherein said second controller is connected with said traffic signal light apparatus and said television cameras through a network.

* * * * *